United States Patent
Suzuki et al.

(10) Patent No.: US 8,981,688 B2
(45) Date of Patent: Mar. 17, 2015

(54) CONTROL DEVICE FOR AC MOTOR

(71) Applicant: Denso Corporation, Kariya, Aichi-pref. (JP)

(72) Inventors: Takashi Suzuki, Anjo (JP); Hirofumi Kako, Chita-gun (JP); Takeshi Itoh, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 14/039,248

(22) Filed: Sep. 27, 2013

(65) Prior Publication Data

US 2014/0091742 A1   Apr. 3, 2014

(30) Foreign Application Priority Data

Sep. 28, 2012 (JP) ................. 2012-216910

(51) Int. Cl.
| | |
|---|---|
| H02P 21/00 | (2006.01) |
| H02H 7/08 | (2006.01) |
| H02H 7/09 | (2006.01) |
| H02P 6/12 | (2006.01) |
| H02P 29/02 | (2006.01) |
| H02P 21/14 | (2006.01) |

(52) U.S. Cl.
CPC ................ *H02P 6/12* (2013.01); *H02P 29/027* (2013.01); *H02P 21/0035* (2013.01); *H02P 21/14* (2013.01)
USPC ............. 318/400.02; 318/400.21; 318/400.22

(58) Field of Classification Search
CPC ............... H02P 6/12; H02P 6/14; H02P 6/16; H02P 6/002; H02P 29/02
USPC ............................ 318/400.02, 400.21, 400.22
See application file for complete search history.

(56) References Cited

U.S. PATENT DOCUMENTS

| | | | |
|---|---|---|---|
| 6,229,719 B1 | 5/2001 | Sakai et al. | |
| 6,828,744 B2 * | 12/2004 | Na | 318/432 |
| 7,208,903 B2 * | 4/2007 | Nakai et al. | 318/609 |
| 2003/0227271 A1 * | 12/2003 | Shindo | 318/439 |
| 2006/0145652 A1 * | 7/2006 | Ta et al. | 318/807 |

(Continued)

FOREIGN PATENT DOCUMENTS

| | | |
|---|---|---|
| JP | H06-253585 | 9/1994 |
| JP | 2004-159398 | 6/2004 |

OTHER PUBLICATIONS

Suzuki, et al., U.S. Appl. No. 14/039,255, filed Sep. 27, 2013.

(Continued)

*Primary Examiner* — Eduardo Colon Santana
*Assistant Examiner* — Gabriel Agared
(74) *Attorney, Agent, or Firm* — Nixon & Vanderhye P.C.

(57) ABSTRACT

A control device for a three-phase alternate current motor includes: an inverter for driving the motor; current sensors for sensing current in the motor; and a control means having a feedback control operation part for operating a voltage command of each phase and switching the inverter based on the voltage command. When an absolute value of a sum of the current sensed values of three phases is larger than a threshold, the control means: executes a provisional current sensor system abnormality determination; generates a variation visualizing state, in which a response of a feedback control with respect to a variation in the current sensed value caused by the abnormality is delayed or stopped; and performs a phase identification processing for identifying the current sensor on a phase, in which an absolute value of a current deviation is larger than a threshold.

10 Claims, 18 Drawing Sheets

(56) References Cited

U.S. PATENT DOCUMENTS

2008/0079385 A1     4/2008   Hashimoto et al.
2008/0252242 A1*   10/2008   Akama et al. ............ 318/400.14
2011/0080127 A1*    4/2011   Akama et al. ............ 318/400.21
2012/0217923 A1*    8/2012   Wu et al. ....................... 318/610

OTHER PUBLICATIONS

Suzuki, et al., U.S. Appl. No. 14/039,262, filed Sep. 27, 2013.
Suzuki, et al., U.S. Appl. No. 14/039,273, filed Sep. 27, 2013.

* cited by examiner

OFFSET ERR IN U-PH

OFFSET ERR IN V-PH

OFFSET ERR IN W-PH

US 8,981,688 B2

CONTROL DEVICE FOR AC MOTOR

CROSS REFERENCE TO RELATED APPLICATION

This application is based on Japanese Patent Application No. 2012-216910 filed on Sep. 28, 2012, the disclosure of which is incorporated herein by reference.

TECHNICAL FIELD

The present disclosure relates to a control device for an AC motor that includes a current sensor for sensing a phase current and that controls current to be passed through an AC motor on the basis of a sensed current value.

BACKGROUND

In recent years, from the social requirement of lower fuel consumption and less exhaust emission, an electric automobile and a hybrid automobile, each of which is mounted with an AC (alternate current) motor as a power source of a vehicle, is drawing attention. For example, in some of the hybrid automobiles, a DC power source made of a secondary battery or the like and an AC motor are connected to each other via an electric power conversion device constructed of an inverter and the like, and the DC (direct current) voltage of the DC power source is converted into AC voltage by the inverter to thereby drive the AC motor.

In the control device of the AC motor mounted in the hybrid automobile or the electric automobile like this, there is known a control device of performing a feedback control on the basis of current sensed values of three phases, which are sensed by the current sensors. For example, a d-axis current and a q-axis current acquired by dq transforming the current sensed values of three phases are fed back to current commands.

Here, there is known the following technique (for example, patent document 1): one current sensor is provided for each phase of a three-phase AC motor; according to the Kirchhoff's law, the sum of currents of three phases to be supplied to the AC motor becomes zero; so that in the case where the sum of current sensed values of three phases does not become zero, it is determined that any one of current sensors is abnormal.

A technique for determining whether or not any one of current sensors is abnormal by monitoring the sum of sensed values of three phases will be described with reference to FIGS. 3A, 3B, and 3C.

At the time of a normal control shown in FIG. 3A, the sum of a U-phase current iu, a V-phase current iv, and a W-phase current iw is always zero, as shown by an equation (1) based on the Kirchhoff's law.

$$iu+iv+iw=0 \qquad (1)$$

Here, for example, as shown in FIG. 3B, it is assumed that an abnormality is caused in which a V-phase current becomes ivs which is offset from iv to a plus side by an error $\Delta is$. Hereinafter, this abnormality is referred to as "offset abnormality". When the offset abnormality is caused, the sum of the current sensed values of three phases (hereinafter referred to as "three-phase sum", as required) becomes $\Delta is$ as shown by an equation (2.1), whereby it is found that at least one current sensor is abnormal, that is, "an abnormality of current sensor system" is caused.

$$iu+ivs+iw=(iu+iv+iw)+\Delta is=\Delta is \qquad (2.1)$$

Further, even when a gain error of a variation in current amplitude as well as the offset error caused by the offset abnormality is caused, the three-phase sum does not become zero, so that an abnormality of the current sensor can be detected.

As shown by the following equations (2.2)~(2.4), however, the detection result (equation (2.3)) in the case where it is assumed that an offset abnormality is caused in the V phase and the detection result (equation (2.2), (2.4)) in the case where it is assumed that an offset abnormality is caused in the U phase or the W phase are absolutely identical with each other and hence cannot be differentiated from each other. In other words, even when the error $\Delta is$ is caused in any one of phases, the three-phase sum similarly becomes $\Delta is$, which hence makes it impossible to identify a phase in which the current sensor is abnormal.

$$(iu+\Delta is)+iv+iw=\Delta is \qquad (2.2)$$

$$iu+(iv+\Delta is)+iw=\Delta is \qquad (2.3)$$

$$iu+iv+(iw+\Delta is)=\Delta is \qquad (2.4)$$

Next, the necessity of identifying a phase in which the current sensor is abnormal will be described.

Firstly, from the viewpoint of trouble shooting, it is necessary to accurately find out an abnormal point. In the case where a current sensor that can be alone replaced is used, only a current sensor made abnormal can be selectively replaced.

Secondly, in the case where only one current sensor is abnormal, by employing the technique of driving the motor by the use of two normal current sensors, the drive of the AC motor can be provisionally continued under a specified condition.

In this way, there is a large need for identifying a phase in which the current sensor is abnormal. As described above, however, it is not possible to identify a phase in which the current sensor is abnormal by the determination using the three-phase sum.

[Patent document 1] Japanese Unexamined Patent Application Publication No. Hei-6-253585

SUMMARY

It is an object of the present disclosure to provide a control device for an AC motor capable of identifying a phase in which an abnormality is caused in a current sensor.

According to an aspect of the present disclosure, a control device for a three-phase alternate current motor includes: an inverter having a plurality of switching elements for driving the three-phase alternate current motor; a plurality of current sensors, each of which senses a current passing through a respective phase among three phases of the alternate current motor; and a control means that has a feedback control operation part for operating a voltage command of each phase so as to converge a deviation between a current sensed value sensed by a respective current sensor and a current command value of a respective phase to be zero and that switches on and off each switching element based on the voltage command of each phase so as to control the current passing through a respective phase of the alternate current motor. When an absolute value of a sum of the current sensed values of three phases is larger than a predetermined three-phase sum threshold value, the control means: executes a provisional current sensor system abnormality determination, which indicates a possibility that an abnormality is generated in at least one of the current sensors; generates a variation visualizing state, in which a response of a feedback control with respect to a variation in the current sensed value caused by an occurrence of the abnormality in the at least one of the current sensors is delayed, or in which the response of the feedback control is stopped; and performs a phase identification processing for identifying the at least one of the current sensors corresponding to a phase, in which an absolute value of a current deviation determined based on a difference between a current basic value and the current sensed value of the phase is larger than a predetermined deviation threshold value, in the variation visualizing state.

In the above control device, it is possible to view an offset error by generating the variation visualizing state in which the response of the feedback control is delayed or stopped. The device performs the phase identification processing of comparing the current sensed value with the deviation threshold value of each phase in the variation visualizing state, thereby being able to identify a phase in which an abnormality is caused in the current sensor.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Hereinafter, embodiments of a control device of an AC motor according to the present disclosure will be described on the basis of the drawings.

Firstly, a construction common to a plurality of embodiments will be described with reference to FIG. 1 and FIG. 2. An electric motor control device 10 as "a control device of an AC motor" according to this embodiment is applied to an electric motor drive system for driving a hybrid automobile.

[Construction of Control Device of AC Motor]

Figure 1:
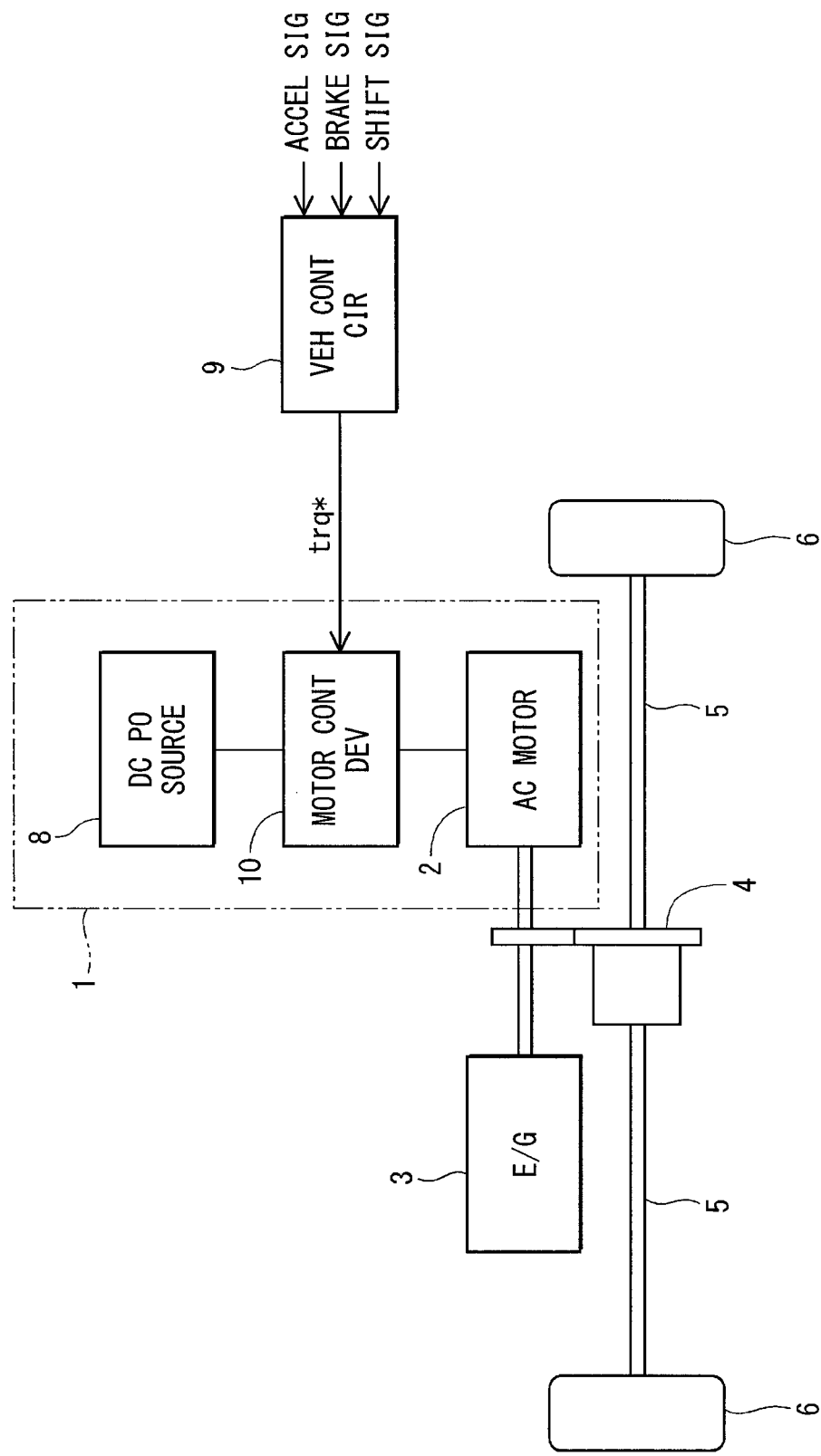
FIG. 1 is an illustration to show a construction of an electric motor drive system to which a control device of an AC motor according to each of a first embodiment to a fourth embodiment of the present disclosure is applied.

As shown in FIG. 1, an electric motor drive system 1 includes an AC motor 2, a DC power source 8, and the electric motor control device 10.

The AC motor 2 is, for example, an electric motor for generating torque for driving the driving wheels 6 of an electric vehicle. The AC motor 2 of the present embodiment is a three-phase permanent-magnet type synchronous motor.

It is assumed that the electric vehicle includes a vehicle for driving the driving wheels 6 by electric energy such as a hybrid automobile, an electric automobile, and a vehicle powered by a fuel cell. The electric vehicle of the present embodiment is a hybrid vehicle mounted with an engine 3, and the AC motor 2 is a so-called motor generator (designated by "MG" in the drawings) having a function as an electric motor that generates torque for driving the driving wheels 6 and a function as a generator that is driven by the engine 3 to thereby generate electricity.

The AC motor 2 is coupled to an axle 5 via a gear 4. In this way, the driving force of the AC motor 2 rotates the axle 5 via the gear 4 to thereby drive the driving wheels 6.

The DC power source 8 is an electric storage device that can charge and discharge, for example, a secondary cell such as a nickel metal hydride cell or a lithium ion cell, and an electric double-layer capacitor. The DC power source 8 is connected to an inverter 12 (see FIG. 2) of the electric motor control device 10, that is, the DC power source 8 is so constructed as to supply electricity to the AC motor 2 and to be supplied with electricity from the AC motor 2 via the inverter 12.

A vehicle control circuit 9 is constructed of a microcomputer and the like and is provided with a CPU, a ROM, an I/O and a bass line for connecting these constructions, all of which are not shown in the drawings. The vehicle control circuit 9 controls the whole of the electric vehicle by software processing, which is performed by executing previously stored programs by the CPU, and by hardware processing, which is performed by a dedicated electronic circuit.

The vehicle control circuit 9 is so constructed as to be able to acquire signals from various kinds of sensors and switches such as an accelerator signal from an accelerator sensor, a brake signal from a brake switch, and a shift signal from a shift switch, all of which are not shown in the drawings. The vehicle control circuit 9 detects a driving state of the vehicle on the basis of the acquired signals and outputs a torque command value trq* responsive to the driving state to the electric motor control device 10. Furthermore, the vehicle control circuit 9 outputs a command signal to an engine control circuit (not shown in the drawings) for controlling the drive of the engine 3.

Figure 2:
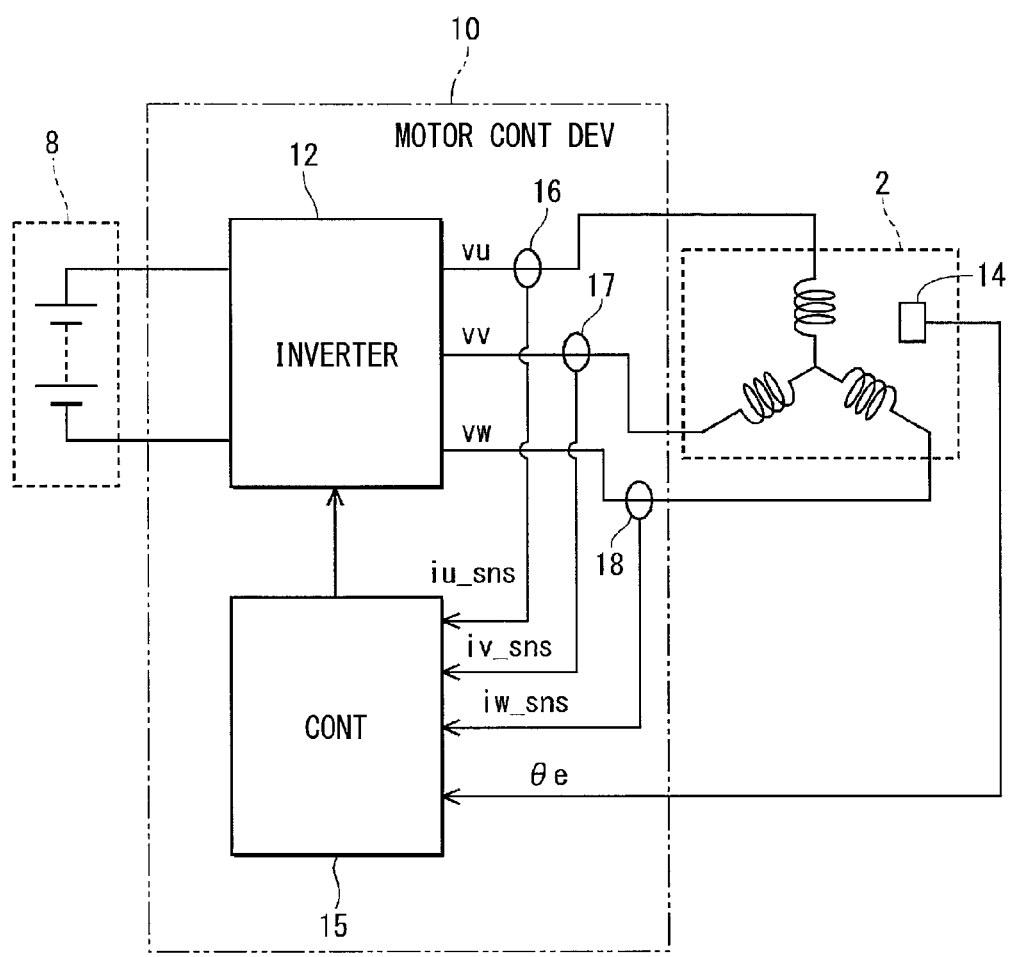
FIG. 2 is a general construction diagram of the control device of the AC motor according to each of the first embodiment to the fourth embodiment of the present disclosure.

As shown in FIG. 2, the electric motor control device 10 is provided with the inverter 12, current sensors 16, 17, 18, and a control section 15 as "a control means".

The inverter 12 has a boost voltage of DC power source inputted thereto, the boost voltage being boosted by a boost converter (not shown in the drawings). The inverter 12 has six switching elements (not shown in the drawings) connected in a bridge mode. As to the switching element, for example, an IGBT (Insulated Gate Bipolar Transistor), a MOS (Metal Oxide Semiconductor) transistor, and a bipolar transistor can be used as the switching elements.

In the case where the inverter 12 is driven by a sine wave control mode or by an over-modulation control mode, typically, the switching element is switched on/off on the basis of a PWM signal, whereby the AC motor 2 has three-phase AC voltages vu, w, vw impressed thereon and hence the drive of the AC motor 2 is controlled. Alternatively, in the case where the inverter 12 is driven by a square wave control mode, a phase is controlled by a voltage phase command.

As to the current sensors 16, 17, 18, one current sensor is provided for each of electric power lines of three phases of U phase, V phase, and W phase, which are connected to the AC motor 2 from the inverter 12, and detects each phase current. The present disclosure is made on the assumption that the current sensors are so constructed as to be "one channel for each of three phases" of this kind.

For reference, a construction such that one current sensor is provided for each of two phases among three phases is referred to as "one channel for each of two phases", whereas a construction such that two current sensors are provided for each of three phases is referred to as "two channels for each of three phases".

By the way, the sum of currents of three phases is always zero by Kirchhoff's law. Hence, when the current values of two phases of three phases are known, the current value of a remaining one phase can be calculated. Therefore, the calculation of dq transformation or the like in a current feedback control can be made on the basis of current sensed values of at least two phases. In this way, a phase in which control is performed on the basis of current value of the phase is referred to as "control phase".

Furthermore, by detecting a current sensed value of one phase other than the control phase, it is possible to monitor whether or not the sum of current values of three phases is zero and to determine whether or not a current sensor system is abnormal. One phase other than the control phase is referred to as "monitor phase". In a first embodiment, a second embodiment, and a fourth embodiment to be described below, a current estimated value of each phase for calculating a current deviation is calculated on the basis of a current sensed value of the monitor phase.

In the first to the fourth embodiments to be described below, basically, it is assumed that control phases are a U phase and a V phase and that a monitor phase is a W phase. Here, in the other embodiments, the U phase or the V phase may be the control phase.

A rotation angle sensor 14 is provided near a rotor (not shown in the drawings) of the AC motor 2 and senses an electric angle θe and outputs the electric angle θe to the control section 15. Further, the number of revolutions N of the AC motor 2 is calculated on the basis of the electric angle θe sensed by the rotation angle sensor 14. The rotation angle sensor 14 of the present embodiment is a resolver but an other type of sensor such as a rotary encoder may be used in the other embodiments.

The control section 15 is constructed of a microcomputer and the like and includes a CPU, a ROM, an I/O, and a bus line for connecting these components (not shown in the drawings). The control section 15 controls the operation of the AC motor 2 by software processing that the CPU performs by executing programs previously stored or by hardware processing performed by a dedicated electronic circuit. The control section 15 will be described later in more detail in each embodiment.

According to the number of revolutions N of the AC motor 2, which is based on the electric angle θe sensed by the rotation angle sensor 14, and a torque command value trq* from the vehicle control circuit 9, the electric motor control device 10 drives the AC motor 2 as an electric motor to perform a powering operation, thereby consuming electricity, or drives the AC motor 2 as a generator to perform a regenerating operation, thereby generating electricity. Specifically, according to the number of revolutions N and to whether the command value trq* is positive or negative, the electric motor control device 10 switches the operation of the AC motor 2 into the following four patterns:

<1. Normal rotation powering operation> when the number of revolutions N is positive and the torque command value trq* is positive, the AC motor 2 consumes electricity;

<2. Normal rotation regenerating operation> when the number of revolutions N is positive and the torque command value trq* is negative, the AC motor 2 generates electricity;

<3. Reverse rotation powering operation> when the number of revolutions N is negative and the torque command value trq* is negative, the AC motor 2 consumes electricity; and <4. Reverse rotation regenerating operation> when the number of revolutions N is negative and the torque command value trq* is positive, the AC motor 2 generates electricity.

In the case where the number of revolutions N>0 (normal rotation) and the torque command value trq*>0, or the number of revolutions N<0 (reverse rotation) and the torque command value trq*<0, the inverter 12 converts the DC electricity supplied from the DC power source 8 to AC electricity by the switching operation of the switching elements to thereby drive the AC motor 2 in such a way as to output torque (perform a powering operation).

On the other hand, in the case where the number of revolutions N>0 (normal rotation) and the torque command value trq*<0, or the number of revolutions N<0 (reverse rotation) and the torque command value trq*>0, the inverter 12 converts the AC electricity generated by the AC motor 2 to DC electricity by the switching operation of the switching elements to thereby supply the DC electricity to the DC power source 8, whereby the AC motor 2 performs a regenerating operation.

[Construction and Operation/Working-Effect of Control Section]

Hereinafter, the construction and operation/working-effect of the control section 15 will be described for each of a first embodiment to a fourth embodiment. Numerals "1" to "4" designating the number of the embodiment are attached to the end of a reference character of "the control section 15".

First Embodiment

Figure 4:
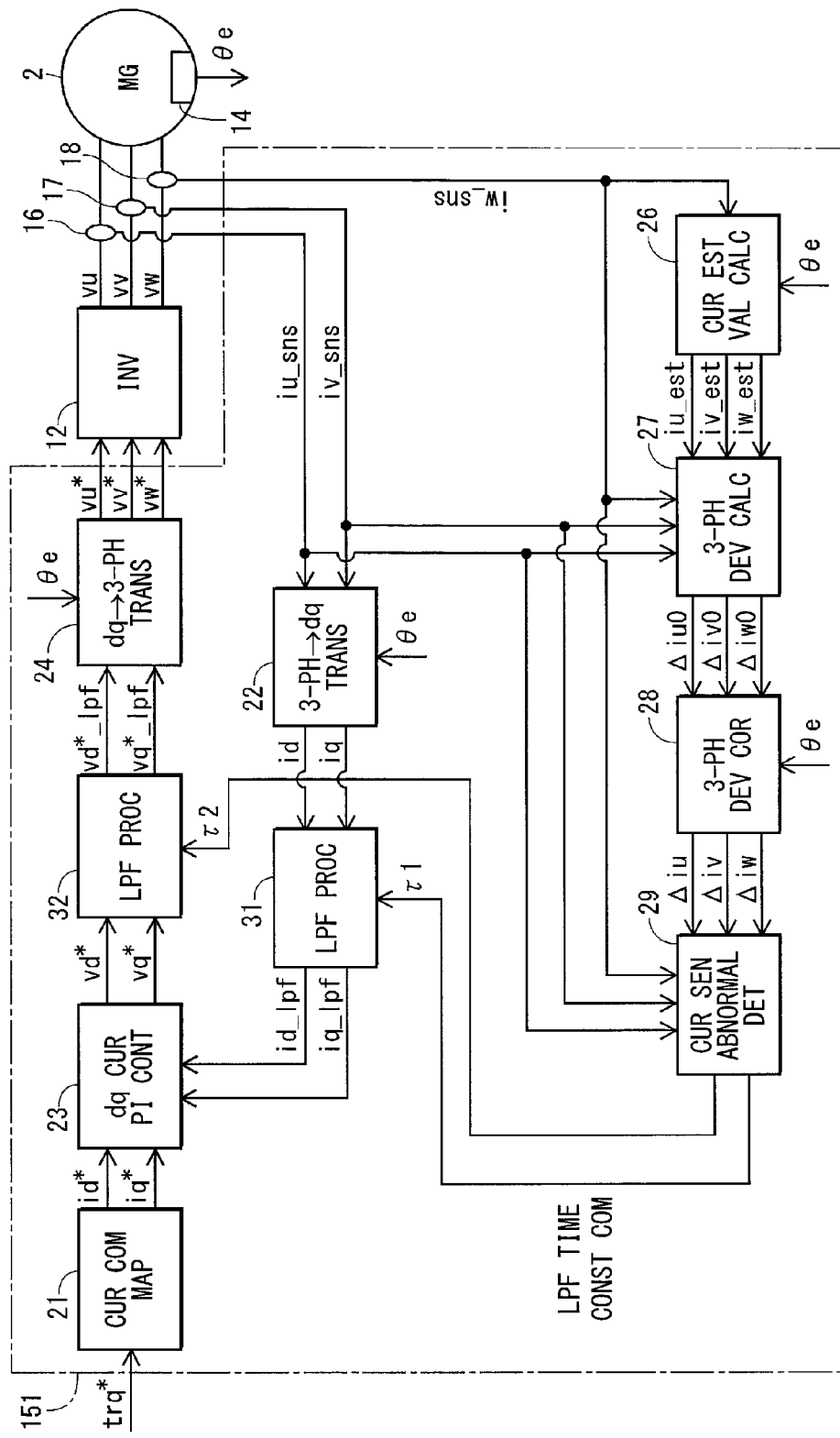
FIG. 4 is a block diagram to show the construction of a control section of the control device of the AC motor according to the first embodiment of the present disclosure.
Figure 5:
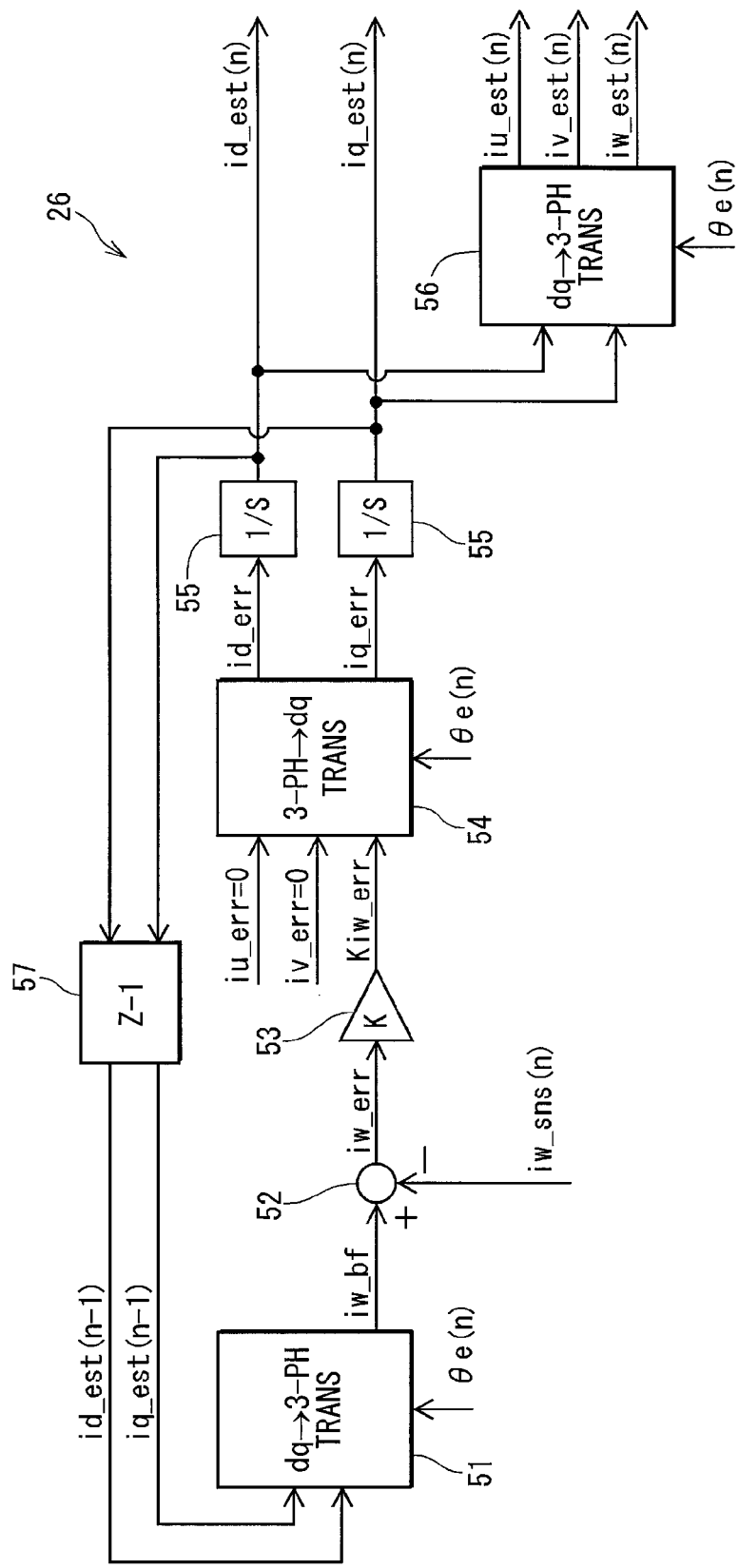
FIG. 5 is a block diagram to show the construction of a current estimation part of the control section shown in FIG. 4.

The construction of the control section 151 of the first embodiment will be described with reference to FIG. 4 and FIG. 5.

A current command MAP 21 calculates a d-axis current command id* and a q-axis current command iq* in a rotating coordinate system (dq coordinate system) of the AC motor 2 on the basis of a torque command value trq* acquired from the vehicle control circuit 9. Hereinafter, "d-axis current and q-axis current" are referred to as "dq currents".

In the present embodiment, the dq current commands id*, iq* are calculated with reference to a previously stored map but may be calculated by the use of mathematical formulas or the like in the other embodiments.

A three-phase→dq transformation part 22 transforms the current sensed values iu_sns, iv_sns of the control phase to dq currents id, iq on the basis of the electric angle θe acquired from the rotation angle sensor 14.

Here, a three-phase→dq transformation based on the current sensed values of two phases will be described. First, a general equation of dq transformation will be shown by the following equation (3).

[Mathematical formula 1]

$$\begin{bmatrix} id \\ iq \end{bmatrix} = \sqrt{\frac{2}{3}} \begin{bmatrix} \cos(\theta e) & \cos(\theta e - 120°) & \cos(\theta e + 120°) \\ -\sin(\theta e) & -\sin(\theta e - 120°) & -\sin(\theta e + 120°) \end{bmatrix} \begin{bmatrix} iu \\ iv \\ iw \end{bmatrix} \quad (3)$$

From the Kirchhoff's law (see an equation (1)), the following equation (4) is acquired by substituting iw=−iu−iv into an equation (3).

[Mathematical formula 2]

$$\begin{bmatrix} id \\ iq \end{bmatrix} = \sqrt{\frac{2}{3}} \begin{bmatrix} \cos(\theta e) - \cos(\theta e + 120°) & \cos(\theta e - 120°) - \cos(\theta e + 120°) \\ -\sin(\theta e) + \sin(\theta e + 120°) & -\sin(\theta e - 120°) + \sin(\theta e + 120°) \end{bmatrix} \begin{bmatrix} iu\_sns \\ iv\_sns \end{bmatrix} \quad (4)$$

$$= \sqrt{\frac{2}{3}} \times \sqrt{3} \begin{bmatrix} -\cos(\theta e + 150°) & \cos(\theta e - 90°) \\ \sin(\theta e + 150°) & -\sin(\theta e - 90°) \end{bmatrix} \begin{bmatrix} iu\_sns \\ iv\_sns \end{bmatrix}$$

$$= \sqrt{2} \begin{bmatrix} \sin(\theta e + 60°) & \sin(\theta e) \\ \cos(\theta e + 60°) & \cos(\theta e) \end{bmatrix} \begin{bmatrix} iu\_sns \\ iv\_sns \end{bmatrix}$$

A dq current PI control part 23 corresponds to "a feedback control operation part". The dq current PI control part 23 calculates dq voltage commands vd*, vq* by PI operation in such a way that both of the deviation between the d-axis current command id* and d-axis current id_lpf and the deviation between a q-axis current command id* and a q-axis current iq_lpf converge to zero, the d-axis current id_lpf and the q-axis current iq_lpf being currents fed back via a three phase→dq transformation part 22 and a LPF processing part 31. The dq voltage commands vd*, vq* are inputted to a dq→three phases transformation part 24 via the LPF processing part 32. Here, "LPF" means a low pass filter.

The dq→three phases transformation part 24 transforms the dq voltage commands vd*, vq* to three-phase voltage commands of a U-phase voltage command vu*, a V-phase voltage command w*, and a W-phase voltage command vw* on the basis of the electric angle θe acquired from the rotation angle sensor 14. The switching elements of the inverter 12 are switched on/off by a PWM signal generated on the basis of the three-phase voltage commands vu*, w*, vw*.

Three-phase AC voltages vu, w, vw are generated by the inverter 12.

When the three-phase AC voltages vu, w, vw are impressed on the AC motor 2, the drive of the AC motor 2 is controlled in such a way that torque responsive to the torque command value trq* is outputted.

Of the construction described up to this point, a construction other than the LPF processing parts 31, 32 corresponds to the construction of a conventional current feedback control. In this conventional construction, the problem described above is presented as a problem to be solved by the present disclosure. This problem will be again described with reference to FIGS. 3A, 3B, and 3C.

Figure 3A:
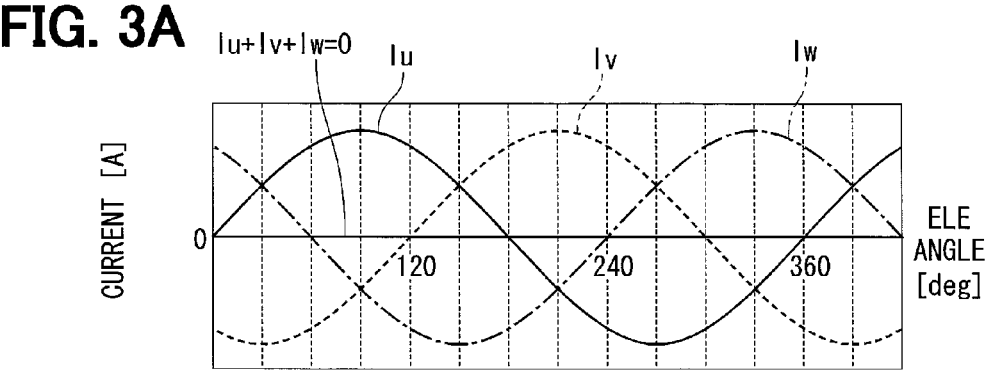
FIGS. 3A, 3B, 3C are schematic illustrations to illustrate a state where a current sensor of one phase causes an abnormal offset in a feedback control.

At the time of a normal control shown in FIG. 3A, the sum of the current sensed values of the current sensors 16, 17, 18 of three phases becomes the following equation (1') by the Kirchhoff' law.

$$iu\_sns + iv\_sns + iw\_sns = 0 \quad (1')$$

Figure 3B:
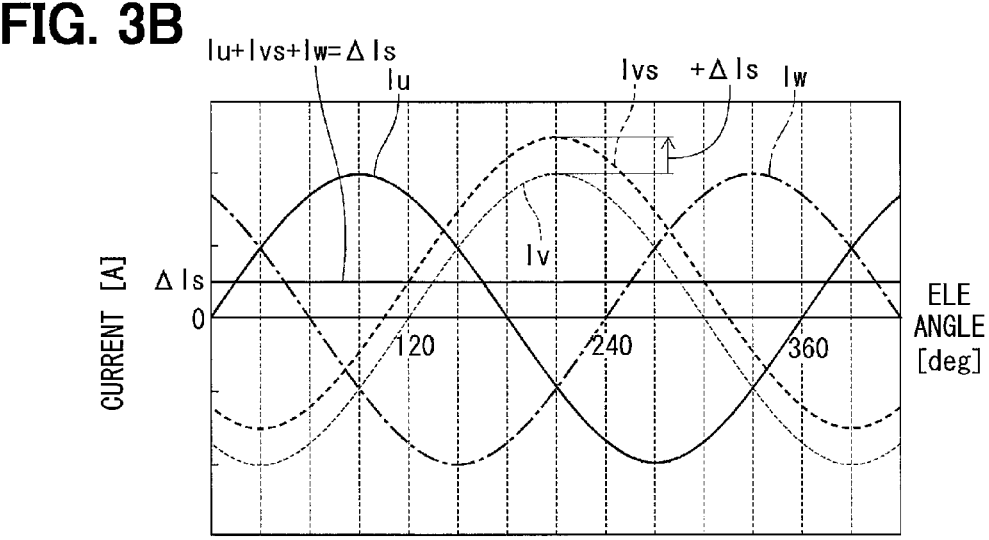

On the other hand, as shown in FIG. 3B, in the case where an error Δis is caused, for example, in the current sensed value iv_sns of the V phase, the sum of the current sensed values of three phases becomes the following equation (2').

$$iu\_sns + iv\_sns + iw\_sns = \Delta is \quad (2')$$

Here, in the case where the absolute value of the error Δis is larger than an abnormality threshold value, it is detected that the current sensor of any one phase is abnormal, but it is not possible to identify the phase of the current sensor that causes the detected value Δis of the three-phase sum.

Then, it can be thought to determine an abnormality of each phase in the following way: the current estimated values of three phases are calculated on the basis of the current sensed value of the W phase of the monitor phase; the current estimated values calculated in this way are made current basic values and the current basic value is compared with the current sensed value for each phase to thereby calculate the deviation between the two values; and an abnormality of each phase is determined from the deviation.

At this time, when an error is caused in the V phase, the dq current values id, iq, which are calculated by the three phase→dq transformation part 22 on the basis of the current sensed values iu_sns, iv_sns of the U phase and the V phase of the control phase, are varied at a primary frequency (electric primary) of a current frequency.

Figure 3C:
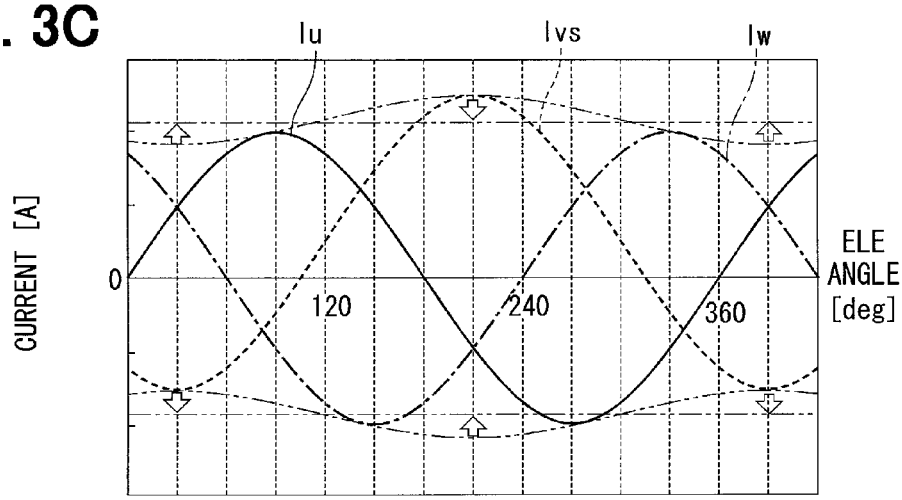

Then, in a high-speed current feedback control, the dq current PI control part 23 performs PI control in such a way as to inhibit the electric primary variations in the dq currents id, iq and outputs voltage commands vd*, vq*. That is, as shown in FIG. 3C, the control of making the currents correspond with the commands is performed. As a result, apparent electric primary variations disappear.

When the electric primary variations disappear and the dq currents id, iq calculated from the sensed current values are so controlled as to correspond with the current commands id*, iq*, the currents to be offset by an error caused in the V phase are controlled to current waveforms having no offset in such a way as to correspond with the current command values in terms of three phases.

Further, as to "a three-phase deviation calculation part 26" which will be described later, as the result of the control described above, the current sensed value of the V phase seems to be apparently not abnormal but the control affects the W phase of the monitor phase to thereby make the current sensed value of the W phase offset. At this time, in reality, the current sensor 18 of the W phase is not abnormal. However, apparently, it is not possible to distinguish this case from the case where an error is caused in the current sensed value by the abnormality of the current sensor 18 of the W phase. Further, also in the case where an abnormality is caused in the U phase, an error is similarly caused in the current sensed value of the W phase.

Hence, even if the deviations between the current sensed values and the current estimated values of the respective phases are calculated by the use of the current estimated values calculated on the basis of the current sensed value of the W phase of the monitor phase, it is not possible to determine that the current sensor of the V phase is abnormal.

Hence, the LPF processing parts 31, 32 in the present embodiment operate in the following way: when the LPF processing parts 31, 32 receive time constant commands from a current sensor abnormality determination part 29, which will be described later, the LPF processing parts 31, 32 make the delay time of an output response to an input variation change longer than that in the normal control. The LPF processing part 31 delays a feedback input to the dq current PI control part 23 for the variations in the dq currents id, iq. The LPF processing part 32 delays a feedback input to the dq→three phase transformation part 24 for the variations in the dq voltage commands vd*, vq* calculated by the dq current PI control part 23. At this time, time constants τ1, τ2 of the LPF processing parts 31, 32 are set, for example, not less than two times the electric primary time constant.

In this way, the response of the feedback control is delayed to thereby bring about "a variation visualizing state". As a result, the variations of the current sensed values iu_sns, iv_sns, iw_sns of the respective phases, which cannot be detected in a high-speed feedback control at the time of a usual operation, can be detected.

Furthermore, the control section 151 of the present embodiment is characterized by including a current estimated value calculation part 26, a three-phase deviation calculation part 27, a three-phase deviation correction part 28, and a current sensor abnormality determination part 29 as a construction for detecting variations in the current sensed values iu_sns, iv_sns, iw_sns of the respective phases and for identifying the phase of the current sensor in which an abnormality is caused.

When the absolute value of the sum of the current sensed values of iu_sns, iv_sns, iw_sns of three phases is larger than a three-phase sum threshold value, firstly, the current sensor abnormality determination part 29 provisionally determines that the current sensor system is abnormal.

In this way, the control section 151 starts "phase identification processing" for identifying a phase in which a current sensor is abnormal. In the phase identification processing, the control section 151 compares a current deviation based on a difference between the current sensed value and "a current basic value" of each of the three phases with the deviation threshold values, thereby determining whether or not the current sensor is abnormal. In the present embodiment, current estimated values iu_est, iv_est, iw_est are used as "the current basic values".

The current estimated value calculation part 26 estimates the current estimated values iu_est, iv_est, iw_est on the basis of the current sensed value iw_sns of the monitor phase (W phase) and the electric angle θe.

The detailed construction of the current estimated value calculation part 26 will be described with reference to FIG. 5. The current sensed value iw_sns of the W phase of the monitor phase is inputted to the current estimated value calculation part 26. Here, it is assumed that current estimation processing based on the current sensed value to be inputted this time is n-th processing and that the current sensed value of the W phase to be inputted this time, the electric angle, and a current estimated value acquired by this processing are expressed by "iw_sns (n)", "θe", and "i#_est (n) (where # designates d, q, u, v, w), respectively".

The current sensed value iw_sns (n) of the monitor phase (W phase) is inputted to a subtractor 52. On the other hand, an estimated current basic value iw_bf outputted from the dq→three phases transformation part 51 is inputted to the subtractor 52. The subtractor 52 calculates a deviation iw_err between the estimated current basic value iw_bf and the current sensed value iw_sns (n). A gain correction part 53 multiplies the deviation iw_err by a gain K (0<K<1) and outputs a gain-corrected deviation Kiw_err. The gain K serves as a filtering element for controlling a speed at which the current estimated value is asymptotic to the current sensed value.

The three phases→dq transformation part 54 dq transforms a U-phase deviation iu_err and a V-phase deviation iv_err, which are fixed at 0, and the gain-corrected deviation Kiw_err on the basis of the electric angle θe, thereby calculating a d-axis current deviation id_err and a q-axis current deviation iq_err. Integrators 55 integrate the d-axis current deviation id_err and the q-axis current deviation iq_err with respect to time, respectively, and output a d-axis current estimated value id_est (n) and a q-axis current estimated value iq_est (n). A dq→three phases transformation part 56 inversely dq transforms the dq axis current estimated values id_est (n), iq_est (n) to three-phase current estimated values iu_est (n), iv_est (n), iw_est (n) on the basis of the electric angle θe (n).

Furthermore, a dq→three phases transformation part 51 has the dq axis current estimated values id_est (n−1), iq_est (n−1) fed back thereto via the delay element 57. The dq→three phases transformation part 51 inversely dq transforms the dq axis current estimated values id_est (n−1), iq_est (n−1) to the current values of three phases on the basis of the electric angle θe and outputs only the transformed value of the W phase of three phases as an estimated current basic value iw_bf.

In this way, by feeding back the estimated current basic value iw_bf based on the current estimated value to the current sensed value iw_sns and by making the current estimated value asymptotic to the current sensed value, the current estimated values of three phases can be estimated with high accuracy on the basis of the current sensed value of one phase of the monitor phase.

A three-phase deviation calculation part 27 calculates current deviations Δiu0, Δiv0, Δiw0, which are a deviation between the current sensed values iu_sns and the current estimated values iu_est, a deviation between the current sensed value iv_sns and the current estimated value iv_est, and a deviation between the current sensed value iw_sns and the current estimated values iw_est, respectively (hereinafter referred to as "current deviations Δiu0, Δiv0, Δiw0 between the current sensed values iu_sns, iv_sns, iw_sns and the current estimated values iu_est, iv_est, iw_est).

A three-phase deviation calculation part 28 corrects the current deviations Δiu0, Δiv0, Δiw0 and outputs corrected current deviations Δiu, Δiv, Δiw. The meaning of this correction including the details of "the phase identification processing" will be described in detail in the description of a flow chart.

A current sensor abnormality determination part 29 compares the corrected current deviations Δiu, Δiv, Δiw with threshold values and determines whether or not the current sensor is abnormal. When the phase in which the current sensor is abnormal is identified or it is concluded that the current sensors of three phases are determined to be normal, the phase determination processing is finished.

Next, a routine of the current feedback control performed by the control section 151 will be described with reference to a flow chart shown in FIG. 6 to FIG. 9. In the description of the flow chart to be provided below, a reference character "S" means a step.

First, a first half of the whole of the current feedback control will be described with reference to FIG. 6.

The control section 151 acquires the electric angle θe from the rotation angle sensor 14 (S101) and acquires phase currents to be supplied to the AC motor 2 from the current sensors 16, 17, 18 of three phases (S102).

The current sensor abnormality determination part 29 calculates the sum of the current sensed values iu_sns, iv_sns, iw_sns of three phases (S103). At this time, it is preferable to perform filtering processing for cutting high-frequency components so as to remove noise and the like.

It is determined whether or not the absolute value of the sum of the current sensed values of three phases (hereinafter referred to as "three-phase sum") is larger than a three-phase sum threshold value (S104). If it is determined that the absolute value of the three-phase sum is not larger than the three-phase sum threshold value (S104: NO), it is determined that the current sensor system is normal and the procedure proceeds to S111.

If it is determined that the absolute value of the three-phase sum is larger than the three-phase sum threshold value (S104: YES), a time counter is counted up (S105). If the time counter is not more than a specified time (S106: NO), it is determined that the current sensor system is not abnormal and the procedure proceeds to S111. On the other hand, if the time counter is more than the specified time (S106: YES), it is provisionally determined that the current sensor system is abnormal (S107). Here, "the current sensor system is abnormal" means that at least one of current sensors 16, 17, 18 of three phases is abnormal.

Furthermore, "it is provisionally determined" means that it is only determined in this step that "the current sensor system is likely to be abnormal". For example, in the case where errors of the same sign are caused in a plurality of current sensors and where an error of the current sensor of each phase is not larger than a threshold value, there can be a case where although the current sensors of three phases are normal, the absolute value of the three-phase sum is larger than the three-phase sum threshold value. It is assumed that an erroneous determination can be made in this case.

In this step, it cannot be found that the current sensor of which phase is abnormal. Then, next, the phase identification processing is performed (S200). The phase identification processing identifies the current sensor of which phase as being abnormal or determines that all of the current sensors of three phases are normal. When it is determined that the number of phases in which the current sensor is abnormal is not less than one, "it is identified that the current sensor system is abnormal".

Figure 8:
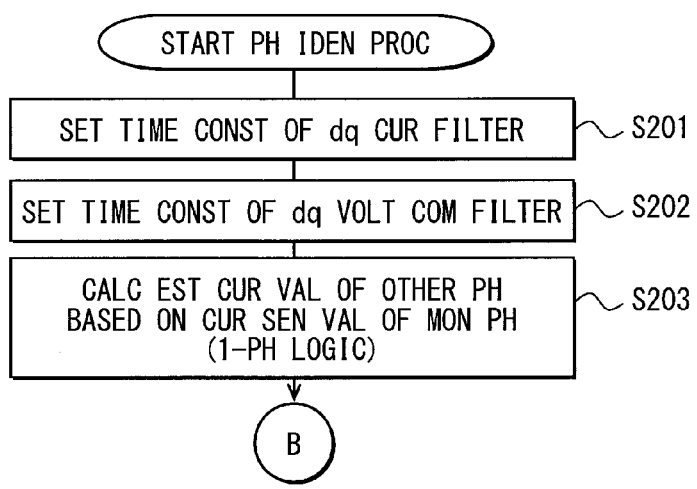
FIG. 8 is a first half of a flow chart of phase identification processing according to the first embodiment of the present disclosure.
Figure 9:
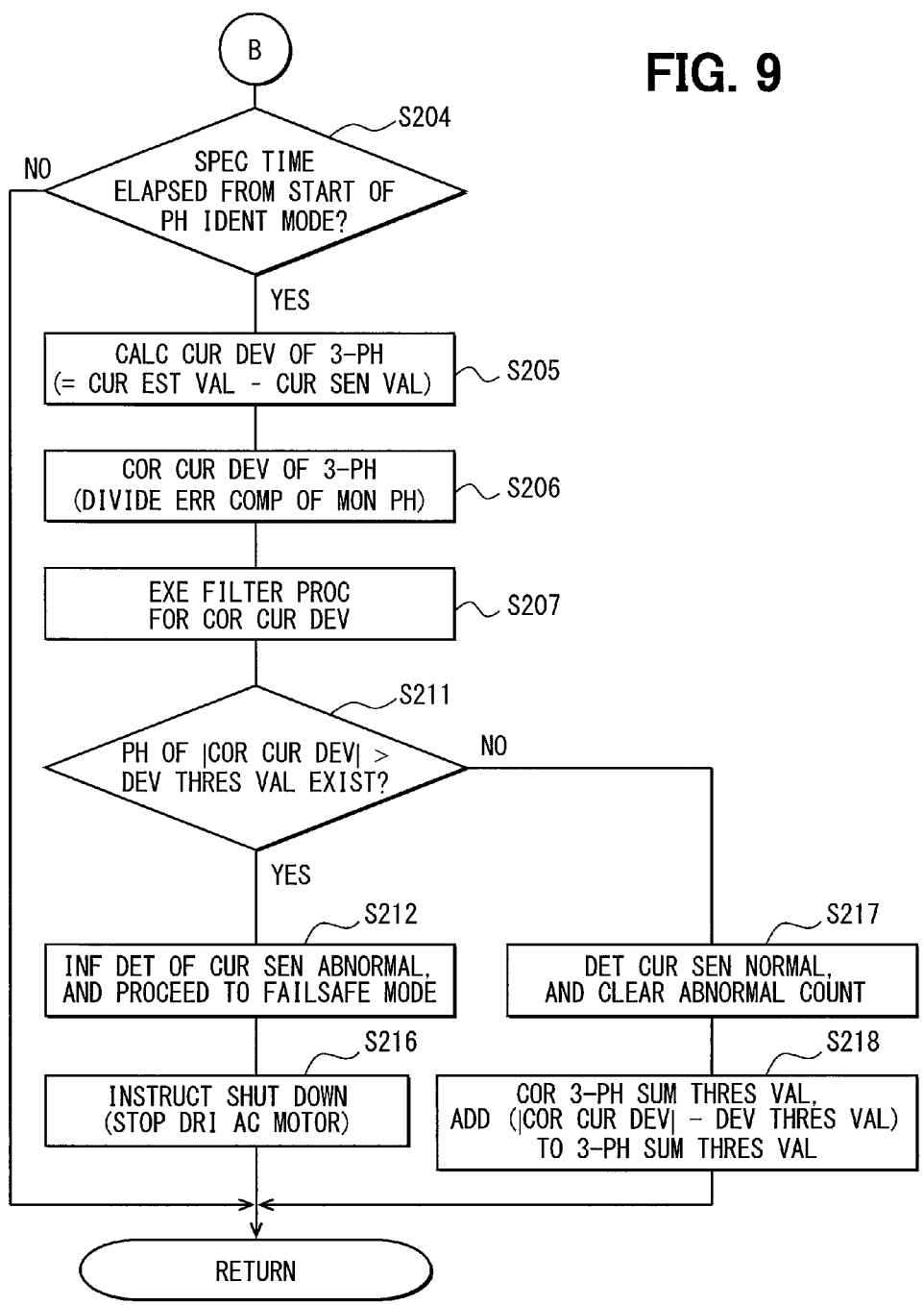
FIG. 9 is a second half of the flow chart of the phase identification processing according to the first embodiment of the present disclosure.

Subsequently, "the phase identification processing" of S200 will be described with reference to FIG. 8 and FIG. 9. Here, a state where the control section 151 performs the phase identification processing is referred to as "a phase identification mode".

In the phase identification processing of the present embodiment, the response of the feedback control is delayed to thereby generate the variation visualizing state so as to visualize an offset error of the current sensed value which is caused by the abnormality of the current sensor.

According to a command from the current sensor abnormality determination part 29, the LPF processing part 31 sets a time constant τ1 of a dq current filter (S201) and the LPF processing part 32 sets a time constant τ2 of a dq voltage command filter (S202). It is preferable that the time constant sτ1, τ2 are set not less than two times the electric primary time constant.

A current estimated value calculation part 26 calculates the current estimated value of the other phase on the basis of the current sensed value iw_sns of one phase of the W phase that is the monitor phase (S203). This calculation processing is referred to as "a single-phasing logic".

Then, in order to wait the convergence of the current estimated value of the other phase in the filter system, it is determined whether or not a specified time passes from the start of the phase identification mode (S204). If it is determined that the specified time does not pass from the start of the phase identification mode (S204: NO), deviation calculation processing after S205 is not performed.

If it is determined that the specified time passes from the start of the phase identification mode (S204: YES), the three-phase deviation calculation part 27 calculates the current deviations Δiu0, Δiv0, Δiw0 between the current estimated values iu_est, iv_est, iw_est of three phases, which are "the current basic values", and the current sensed values iu_sns, iv_sns, iw_sns of three phases (S205).

Subsequently, the three-phase deviation correction part 28 corrects the current deviations Δiu0, Δiv0, Δiw0 calculated by the three-phase deviation calculation part 27 (S206).

Here, the meaning of this correction will be described with reference to FIG. 10 and FIGS. 11A, 11B, 11C.

Figure 10:
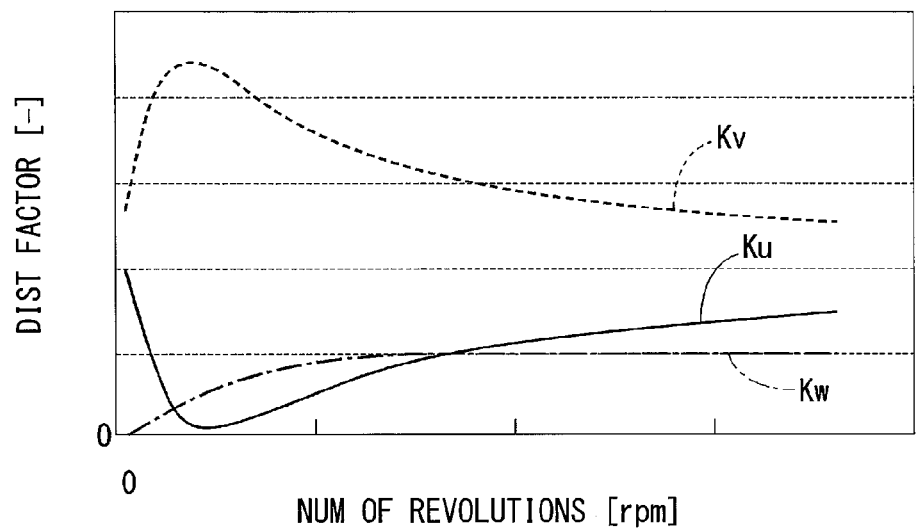
FIG. 10 is a graph to show a relationship between a distribution factor and the number of revolutions, the distribution factor being a factor at which an offset error caused in a W phase (monitor phase) is distributed to current deviations of a U phase and a V phase (which are control phases)

When an offset error is caused in the monitor phase, the offset error affects the current estimated value of the other phase which is calculated on the basis of the current sensed value iw_sns of the monitor phase. FIG. 10 shows a relationship between a distribution factor and the number of revolutions, the distribution factor being a factor at which an error caused in the W phase of the monitor phase is distributed to the U phase and the V phase.

From FIG. 10, it is found that a distribution factor kw, at which the error of the W phase is reflected to the current estimated value of W phase itself is approximately from 0 to 20% and that distribution factors ku, kw at which the error of the W phase is reflected to the current estimated values of the U phase and the V phase, respectively are approximately 80% of the error within a high rotation range and 80% or more within a low rotation range. Hence, even if it is tried to make the determination on the basis of the current deviations Δiu0, Δiv0, Δiw0, which are calculated by the three-phase deviation calculation part 27, as they are, it is impossible to differentiate an error caused by the abnormality of the current sensor of the control phase from an error caused by the abnormality of the current sensor of the monitor phase, which hence makes it impossible to identify an abnormal phase.

Hence, the control section 151 stores a distribution factor characteristics corresponding to FIG. 10 as a map or a mathematical formula. The three-phase deviation correction part 28 finds a distribution factor, which corresponds to the number of revolutions calculated from the electric angle θe, from the map or the mathematical formula and calculates the corrected current deviations Δiu, Δiv, Δiw by the use of the following equations (5.1) to (5.3). This processing divides effect by the error of the monitor phase of the apparent error and is referred to as "dividing correction".

$$\Delta iu = \Delta iu0 - \Delta iw0 \times ku/kw \quad (5.1)$$

$$\Delta iv = \Delta iu0 - \Delta iw0 \times kv/kw \quad (5.2)$$

$$\Delta iw = \Delta iw0/kw \quad (5.3)$$

Figure 11A:
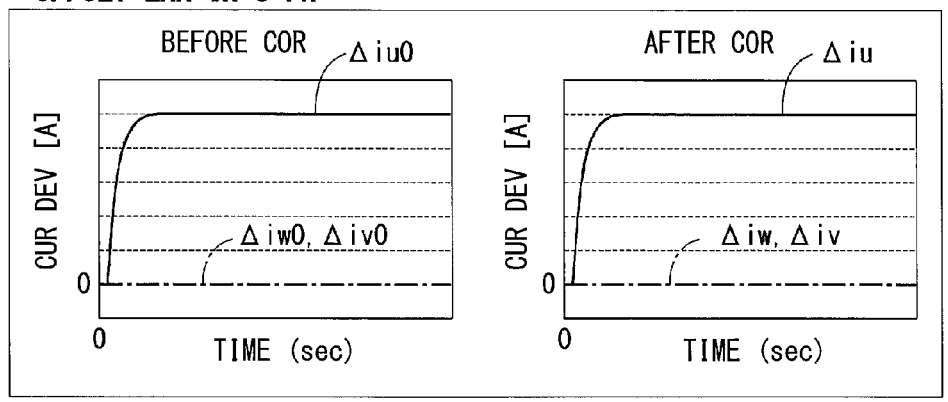
FIGS. 11A, 11B, 11C are schematic graphs to show a current deviation before and after correction when an offset error is caused in each phase.
Figure 11B:
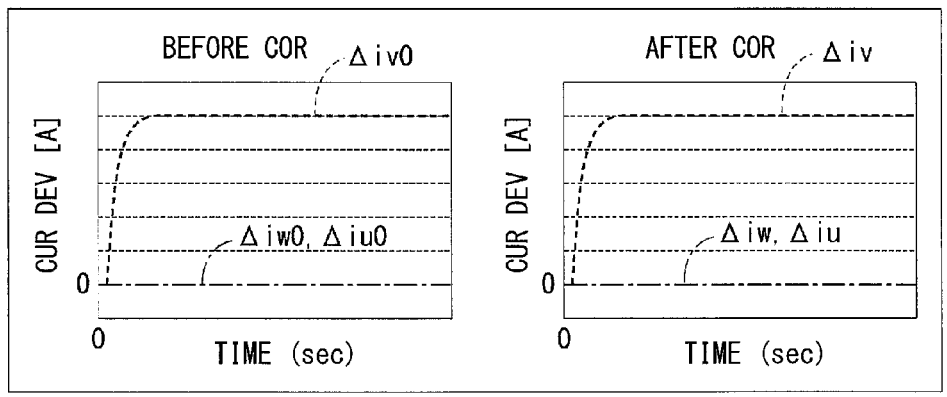
Figure 11C:
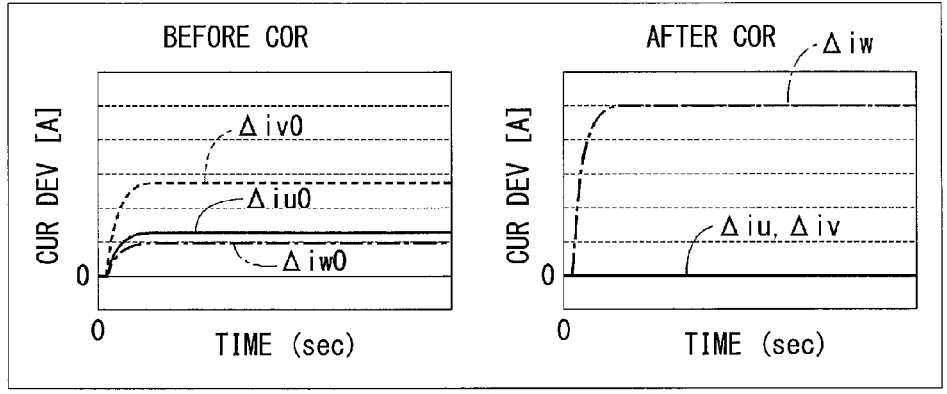

Each of FIGS. 11A, 11B, 11C shows a response waveform of the current deviation which is produced before and after the three-phase deviation correction part 28 makes correction when an offset error is caused in the respective phases. As shown in FIGS. 11A and 11B, when an offset error is caused in the U phase or the V phase, which is the control phase, response waveforms of the current deviation before and after the correction do not vary from each other and hence do not need to be corrected. On the other hand, as shown in FIG. 11C, when an offset error is caused in the W phase, which is the monitor phase, apparent current deviations Δiu0, Δiv0 are developed in the response waveforms of the U phase and the V phase, which are not abnormal in essence. Hence, by dividing a component derived from the error of the monitor phase from the current deviation, the current deviation can be properly corrected.

Returning to FIG. 9, the current sensor abnormality determination part 29 performs the filtering processing for the corrected current deviations Δiu, Δiv, Δiw corrected by the three-phase deviation correction part 28 so as to remove noise and the like (S207) and then determines whether or not there is a phase in which the state where "absolute value of corrected current deviation>deviation threshold value" (S211). If there is one or more phase in which "absolute value of corrected current deviation>deviation threshold value" (S211: YES), the determination such that the current sensor is abnormal is sent and the phase identification mode is shifted to a failsafe mode (S212).

In the case where the current sensor is determined to be abnormal, the accuracy and the reliability of the current feedback control is likely to be not secured. For this reason, there is likely to be brought about a state where an excessive current is supplied to the inverter 12 to thereby break an element or, on the contrary, a state where a necessary current is not supplied to the inverter 12 to thereby prevent the AC motor 2 from being suitably driven. In particular, in a motor control device mounted in an electric vehicle such as a hybrid automobile, drivability is likely to be impaired.

Hence, in the case where the current sensor is determined to be abnormal, from the viewpoint of failsafe, in the present embodiment, "shutdown" of stopping the drive of the AC motor 2 is indicated without an exception (S216).

When the shutdown is performed, the current is not passed through the AC motor 2, whereby an output torque is brought into zero. In the case of the hybrid automobile, a driver pulls off the automobile to the side of the road by inertia running and then stops the automobile. Alternatively, the driver may switch the inertia running to running by an engine 3 by providing an instruction to the vehicle control circuit 9.

Furthermore, there is not a phase in which "absolute value of corrected current deviation>deviation threshold value" (S211: NO), it is determined that the current sensor system is normal and an abnormality counter is cleared (S217). In this case, although the absolute values of the corrected current deviation Δiu, Δiv, Δiw of the respective phases are not larger than the deviation threshold value, the absolute value of the three-phase sum is larger than the three-phase sum threshold value (S104), so that it is thought that it is erroneously determined that the current sensor system is abnormal.

For example, if it is assumed that there is set a determination criterion such that a state where "the absolute value of the error is not less than 100 is abnormal, in the case where the error of the U phase is +50 and where the error of the V phase is +50, it is determined that each current sensor is normal but the absolute value of the sum of the errors becomes 100, so that it is determined in terms of the three-phase sum threshold value that the current sensor system is abnormal. If it is determined in S217 that the current sensor system is normal and then the procedure simply returns to the usual control routine as it is, the following procedure is repeated: "the current sensor system is determined to be abnormal in terms of the three-phase sum→the phase identification mode→the current sensor system is determined to be normal in terms of the three-phase sum→the usual control routine→the current sensor system is determined to be abnormal in terms of the three-phase sum, and so on", which hence results in repeatedly performing the phase identification mode in which the control response is reduced.

Then, in order to prevent an erroneous determination from being recurrently made, a minimum value of the differences between the absolute values of the corrected current deviations of the respective phases and the deviation threshold value is added to a previous three-phase sum threshold value to thereby correct the three-phase sum threshold value (S218). For example, in the case where an error of the U phase is +40 and where an error of the V phase is +60, the difference between the error and the phase sum threshold value is 60 for the U phase and 40 for the V phase, so that 40 of a minimum value of the differences between the error of the respective phases and the previous phase sum threshold value is added to 100 of the previous three-phase sum threshold value, whereby a new three-phase sum threshold value is set at 140. In this way, in the case where the error of the U phase remains unchanged at +40 and the error of only the V phase increases, the current sensor of V phase is determined to be normal in terms of the three-phase sum until the error of the V phase increases to +99. Furthermore, when the error of the V phase becomes +100, the absolute value of the sum of the errors of the U phase and the V phase reaches 140 and hence an abnormality determination is made in terms of the three-phase sum. Then, when the phase identification mode is performed, because the error of only the V phase reaches +100, the current sensor 17 of the V phase can be determined to be abnormal.

However, when a state where the three-phase sum threshold value is corrected to 140 continues in this example, if the error of the U phase decreases to 0 and the error of the V phase increases to +100 after that, the error of the V phase reaches +100 by itself and hence an abnormality determination has to be made essentially. However, in the state where the three-phase sum threshold value remains unchanged at 140, it cannot be detected that the current sensor of V phase is abnormal.

Hence, after the three-phase sum threshold value is corrected, the three-phase sum threshold value may be returned bit by bit to the original three-phase sum threshold value by the use of a filter having a large time constant, or after a given time passes, the three-phase sum threshold value may be returned to the original three-phase sum threshold value by the use of a timer.

Next, the latter half of the whole of the current feedback control will be described with reference to FIG. 7.

If the instruction of the shutdown described above is made (S111: YES), the current feedback control is finished. On the other hand, if the current sensors 16, 17, 18 of three phases are normal and the instruction of the shutdown is not made (S111: NO), the procedure proceeds to S112 and the normal current feedback control is performed.

Thereafter, the three phases→dq transformation part 22 calculates the dq currents id, iq by the three phases→dq transformation based on the current sensed values iu_sns, iv_sns of two phases (U phase and V phase) of the control phase (S112). The LPF processing part 31 performs the filtering processing for the dq currents id, iq and feeds back the dq currents id_lpf, iq_lpf to the dq current PI control part 23 (S113).

The dq current PI control part 23 operates the dq voltage commands vd*, vq* by the PI control operation (S114). The LPF processing part 23 performs the filtering processing for the dq voltage commands vd*, vq* and outputs dq voltages vd*_lpf, vq*_lpf (S115). The dq→three phases transformation part 24 calculates the three-phase voltage commands vu*, w*, vw* by the inverse dq transformation (S117) and outputs the three-phase voltage commands vu*, w*, vw* to the inverter 12 (S118).

Here, in the "filtering processing" in S113, S115 during the normal control, there is no reason for delaying the control response, so that the time constant of the filtering may be set smaller than the electric primary time constant, for example, at zero. In this way, "the filtering processing" shown in S113, S115 includes a case where the delay of control response is not substantially caused.

Up to this point, the routine of the current feedback control performed by the control section 151 will be finished.

The operation/working-effect of the electric motor control device of the present embodiment will be described.

(1) The control section 151 delays the response of the current feedback control by the LPF processing parts 31, 32 to thereby produce the variation visualizing state, thereby visualizing the error of the current sensor. Further, the control section 151 performs the phase identification processing in the variation visualizing state, thereby being able to identify a phase in which the current sensor is abnormal.

(2) The three-phase deviation correction part 28 corrects the current deviations Δiu0, Δiv0, Δiw0, which are calculated by the three-phase deviation calculation part 27, by "the dividing correction" to thereby calculate the corrected current deviations Δiu, Δiv, Δiw.

In this way, when an error is caused in the monitor phase, error components to be distributed to the current deviations Δiu0, Δiv0 of the other phases (U phase and V phase) by the error of the current sensed value of the monitor phase (W phase) can be divided on the basis of the given distribution factors. Hence, an erroneous determination in the phase identification processing can be prevented.

(3) When it is identified by the phase identification processing that an abnormality is caused in one or more current sensor, the control section 151 stops the drive of the AC motor by the instruction of the shutdown. This can improve the reliability of the AC motor 2.

(4) When it is identified by the phase identification processing that the current sensors of three phases are normal, it can be estimated that "although the error of the current sensor of each phase is not more than the threshold value, because the current sensors of a plurality of phases cause errors of the same sign, the absolute value of the three-phase sum is more than the three-phase sum threshold value and hence the current sensors are determined to be abnormal". In this way, it can be identified by the phase identification processing whether or not a determination result by the three-phase sum is suitable.

(5) When it is identified by the phase identification processing that the current sensors of three phases are normal, the control section 151 corrects the three-phase sum threshold value used for the provisional determination of the abnormality of the current sensor system on the basis of the current deviations of three phases. The control section 151 adds "a minimum value of differences between the current deviation and the deviation threshold value of the respective phases" to the previous three-phase sum threshold value, thereby being able to prevent the erroneous determination of "the provisional determination of the abnormality of the current sensors" from being recurrently made thereafter by the same current sensed value.

In the phase identification mode, the current feedback control is performed in a state where the essentially required response of the current feedback control is reduced. Further, when switching between the normal control routine and the phase identification mode are frequently made, although the normal determination is made, the continuity of the control is reduced, which results in giving the driver the sense of uncomfortable ride, for example, in the case of the hybrid automobile. Hence, by correcting the three-phase sum threshold value to thereby inhibit the determination of the abnormality of the current sensor system, it is possible to prevent the driver from having the sense of uncomfortable ride given thereto.

Next, the electric motor control device of the second to fourth embodiments of the present disclosure will be described with reference to FIG. 12 to FIG. 20. In the descriptions of the block diagrams and the flow charts of the following embodiments, the same constructions and the same steps as those in the first embodiment will be denoted by the same reference symbols and the same step numbers and their descriptions will be omitted. Different points from the first embodiment will be described in detail.

Second Embodiment

An electric motor control device of the second embodiment of the present disclosure will be described with reference to FIG. 12 to FIG. 14. The second embodiment is characterized in that after it is identified by the phase identification processing that the current sensor is abnormal, the drive of the AC motor 2 can be provisionally continued under a specified condition on the basis of the failsafe idea. In other words, as described in the problems to be solved by the present disclosure, in the case where it is identified by the phase identification processing that only one current sensor is abnormal, by employing the technique of driving the AC motor 2 by the use of two normal current sensors, the drive of the AC motor 2 can be provisionally continued under a specified condition.

In this case, as a first method of continuing the drive of the AC motor 2 is proposed the method of making two phases "control phase" and of using the current sensed values of the current sensors of the two phases for controlling. Hereinafter, this control method is referred to as "a two-phase control".

However, in this case, there is presented a problem that a current sensor for detecting an abnormality cannot be secured as a separate current sensor.

Secondly, as a second method of continuing the drive of the AC motor 2 is proposed the technique of controlling the drive of the AC motor 2 on the basis of the current sensed value of the current sensor of only one phase. Hereinafter, this technique is referred to as "current sensor single-phasing technique", and a control method based on the current sensor single-phasing technique is referred to as "a one-phase control". In this technique, by using another normal current sensor other than the current sensor for controlling as a sensor for monitoring, an abnormality of the current sensor can be detected. A phase for which the current sensor for detecting an abnormality is provided is "a monitor phase".

The current sensor single-phasing technique is the technique of estimating a current value of the other phase on the basis of the information of the current sensed value of one phase and the rotation angle of the AC motor 2 to thereby control the drive of the AC motor. The technique reduces the number of current sensors and an installation space and hence contributes to a reduction in cost and size of the control device of the AC motor 2. Depending on the accuracy of the current estimated value, control performance can be reduced when compared with the two-phase control or the three-phase control, but a practical function can be performed by limiting the usage conditions of the AC motor 2 and the like.

For example, in the control device of the AC motor applied to the electric vehicle such as the hybrid automobile or the electric automobile, in the case where an abnormality is caused in the control device, there is made the request of "an evacuative running" of not immediately stopping the vehicle but of informing the driver of an abnormality and moving the vehicle and the occupant to a safe place including a temporary refuge and a dealer. In "the evacuative running", the request of acceleration performance and the sense of comfortable ride (drivability) is moderated. Hence, under the condition "that the driving of significantly changing an output torque and the number of revolutions, which are requested of the AC motor, is avoided as much as possible", "the two-phase control" or the "one-phase control" according to the second embodiment cannot satisfy the request of acceleration performance and the sense of comfortable ride at the normal running but can sufficiently function as the control for the evacuative running.

Here, in the case where an abnormality is caused in the current sensor also during the evacuative running, if the abnormality cannot be detected, the AC motor is controlled on the basis of the erroneous current sensed value and has current passed therethrough, which is likely to cause a secondary failure by over-current or to cause an accident by abnormal acceleration or deceleration. Hence, it is essential to provide the monitoring function of determining whether the current sensor is normal or abnormal. Therefore, also during the evacuative running, it is necessary to provide two normal current sensors of a current sensor for controlling and a current sensor for monitoring.

For this reason, in a system in which one current sensor is provided for each phase of a three-phase AC motor, the evacuative running can be performed in the case where an abnormality is caused in the current sensor of only one phase.

In other words, the evacuative running can be performed only when all of the following conditions are satisfied: among three phases, a phase in which a current sensor is abnormal is identified (phase identification); it is determined whether or not a phase in which an abnormality is caused in the current sensor is only one phase (determination of possibility of evacuative running); and the AC motor is controlled by the use of the current single-phasing technique and at the same time a current sensor for monitoring is secured separately (selection of the control phase and the monitor phase).

As described above, in the electric vehicle such as the hybrid automobile and the electric automobile, on the basis of the idea of realizing "the evacuative running", in the second embodiment, "the identification of the phase in which abnormality is caused in the current sensor" is combined with the technique of selecting "one phase of the control phase and one phase of the monitor phase" and performing control by "the current sensor single-phasing technique" when it is determined that the phase in which an abnormality is caused in the current sensor is only one phase.

Figure 12:
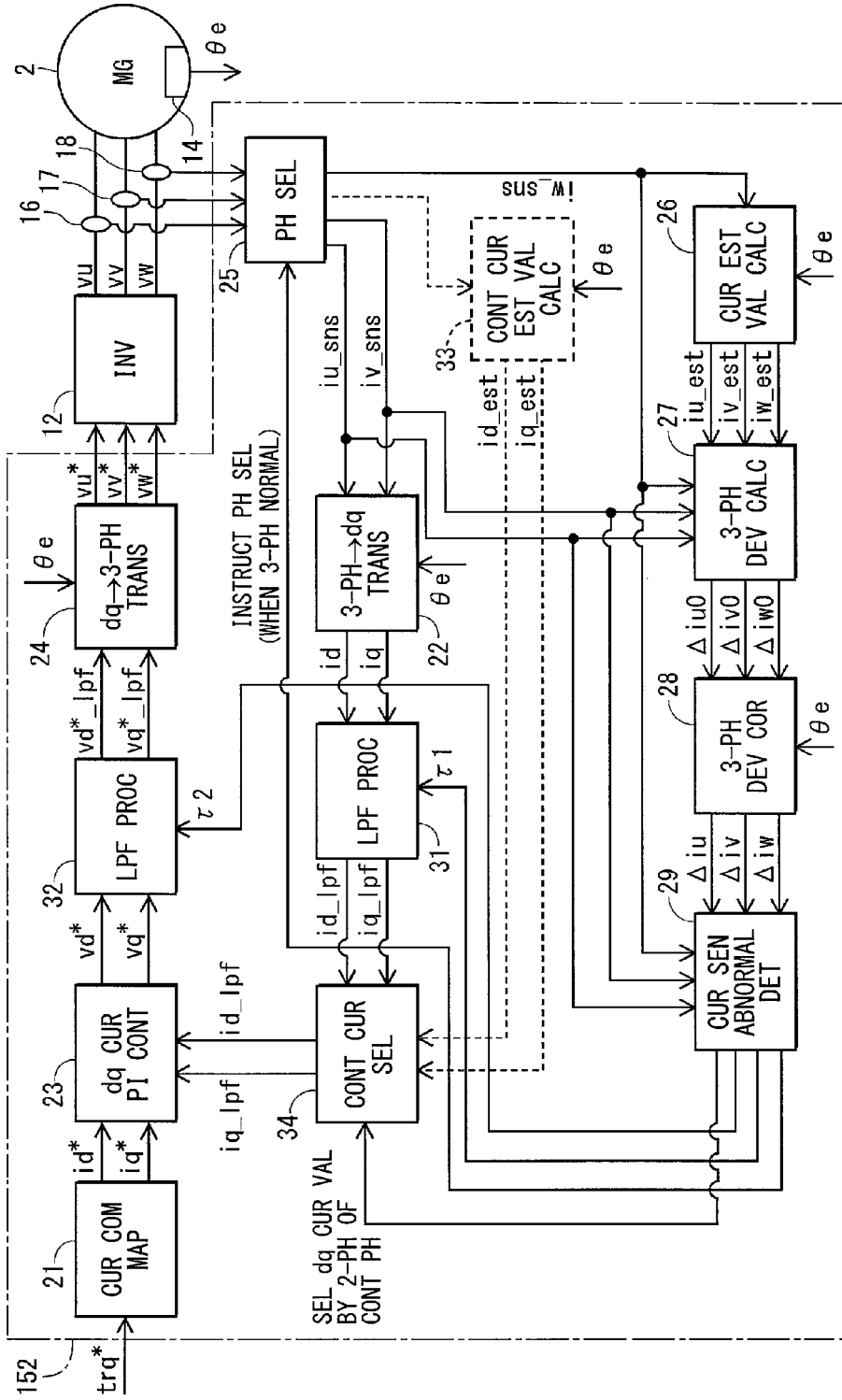
FIG. 12 is a block diagram to show the construction of a control section of the control device of the AC motor according to a second embodiment of the present disclosure.
Figure 13:
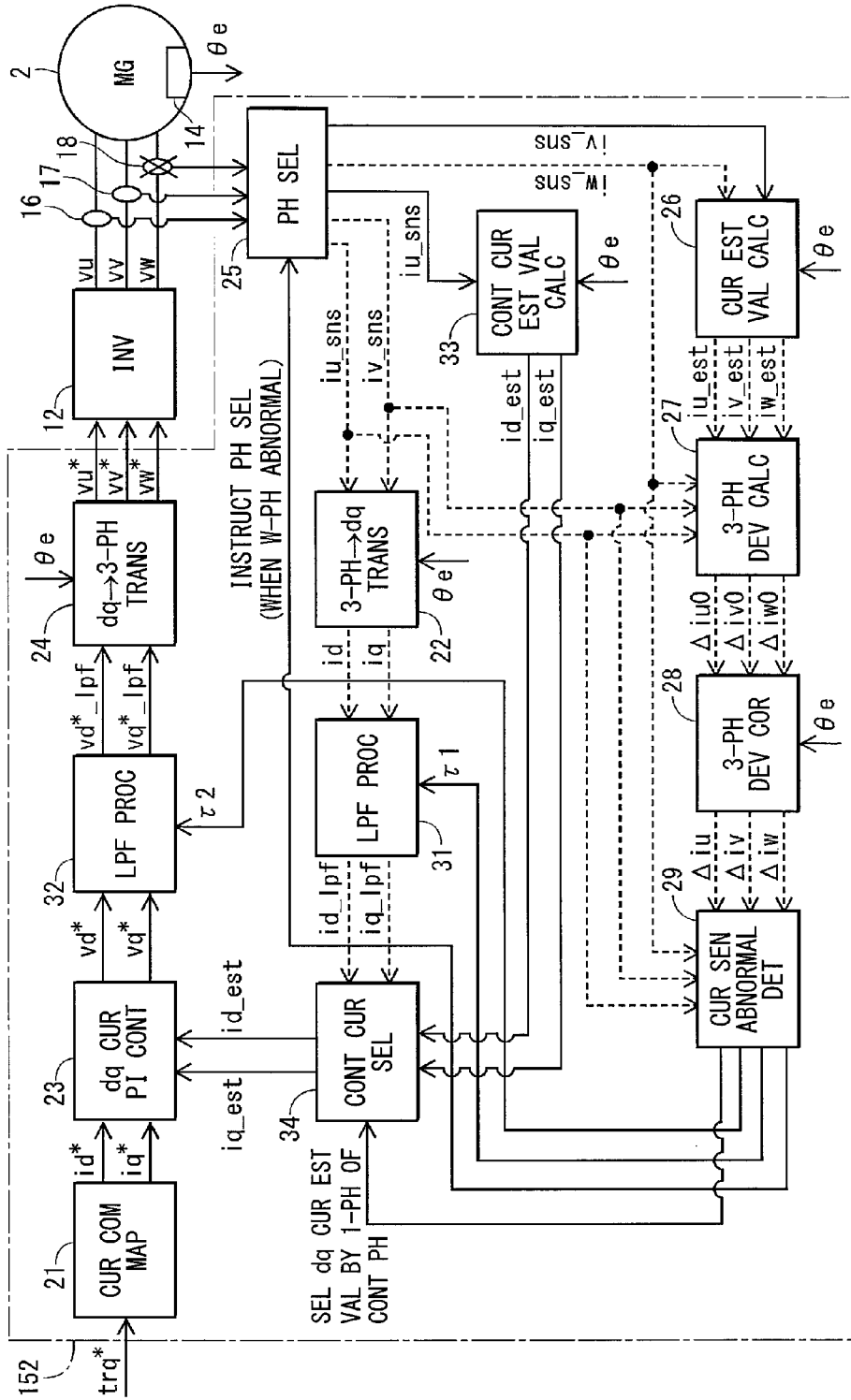
FIG. 13 is a block diagram when a current sensor of the W phase is determined to be abnormal in the control section shown in FIG. 12.

As shown in FIG. 12 and FIG. 13, a control section 152 of an electric motor control device of the second embodiment further includes a phase selection part 25, a control current estimated value calculation part 33, and a control current selection part 34 as compared with the control section 151 of the first embodiment.

When it is identified that an abnormality is caused in the current sensor of one phase of three phases, the phase selection part 25 selects one phase of two normal phases (U phase and V phase) as a control phase and selects the other one phase as a monitor phase.

The control current estimated value calculation part 33 calculates the dq current estimated values id_est, iq_est on the basis of the current sensed value of the control phase. Here, the method of estimating the dq estimated values from the current sensed value of one phase is the same as the current estimation method performed by the current estimated value calculation part 26 described with reference to FIG. 5.

The control current selection part 34 selects either the dq current values id_lpf, iq_lpf or the dq current estimated values id_est, iq_est as the dq currents to be fed back to the dq current PI control part 23, the dq current values id_lpf, iq_lpf being transformed by the three phase→dq transformation part 22 and being subjected to the filtering processing by the LPF processing part 31, the dq current estimated values id_est, iq_est being calculated by the control current estimated value calculation part 33.

When the current sensor abnormality determination part 29 provisionally determines that the current sensor system is abnormal, as is the case of the first embodiment, the current sensor abnormality determination part 29 instructs to increase the time constants τ1, τ2 of the LPF processing parts 31, 32 and then determines whether or not the current sensor is abnormal on the basis of the corrected current deviations Δiu, Δiv, Δiw.

In the case where the current sensors are not determined to be abnormal, that is, the current sensors of three phases are determined to be normal, as shown in FIG. 12, the phase selection part 25 keeps the monitor phase at the W phase. Further, the control current selection part 34 selects the dq current values id_lpf, iq_lpf as the dq currents to be fed back to the dq current PI control part 23, the dq current values id_lpf, iq_lpf being dq transformed by the three phase→dq transformation part 22 on the basis of the current sensed values iu_sns, iv_sns of two phases of the control phase (U phase and V phase) and then being subjected to the filtering processing by the LPF processing part 31.

In this regard, as shown by broken lines, the dq current estimated values id_est. iq_est calculated by the control current estimated value calculation part 33 are not used for the control.

On the other hand, in the case where an abnormality is caused in the current sensor of only one phase, the control current selection part 34 selects "the dq current estimated values based on the one phase of the control phase" as the dq currents to be fed back to the dq current PI control part 23.

In the case where one phase in which the current sensor is abnormal is the W phase of "the monitor phase at the time of starting the phase identification mode", the phase selection part 25 selects one phase in which the current sensor is normal of the U phase and the V phase as a control phase and selects the other one phase as a new monitor phase as an alternative to the W phase.

FIG. 13 shows the case where the current sensor 18 of the W phase becomes abnormal and where the U phase and the V phase are selected as a control phase and the monitor phase, respectively, in the fail safe mode. The control current estimated value calculation part 33 calculates the dq current estimated values id_est, iq_est on the basis of the current sensed value iu_sns of the U phase of the control phase. The control current selection part 34 selects the dq current estimated values id_est, iq_est as the dq currents to be fed back.

Here, the dq currents id, iq passed through the route of the three phases→dq transformation part 22 and the LPF processing part 31, as shown by the broken lines, are used for the control. Further, in FIG. 13, signal lines, which are not used after the phase identification mode is finished, are shown by the broken lines.

Further, in the case where one phase in which the current sensor is abnormal is the U phase or the V phase, the phase selection part 25 keeps the monitor phase at the W phase. Then, one phase in which the current sensor is normal of the U phase and the V phase is made the control phase, and the dq current estimated values id_est, iq_est, which are calculated on the basis of the current sensed value of the control phase by the control current estimated value calculation part 33, are selected as the dq currents to be fed back by the control current selection part 34.

In this way, the control phase and the monitor phase are clearly differentiated from each other, so that it is possible to avoid "the interference of the current feedback control" such that the error of the current sensed value of the monitor phase affects the current sensed value of the control phase.

Figure 14:
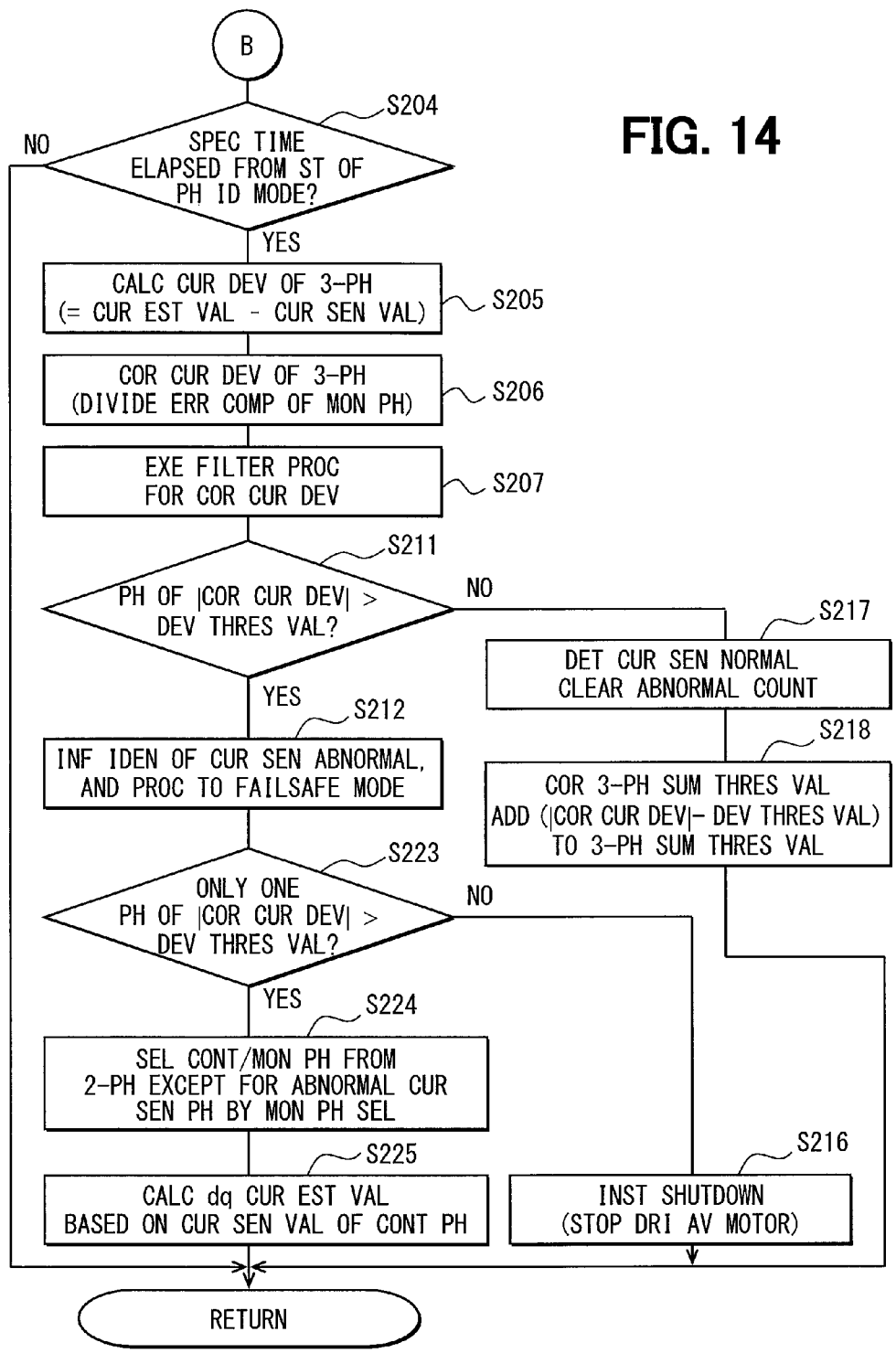
FIG. 14 is a second half of a flow chart of phase identification processing according to the second embodiment of the present disclosure.

Next, the latter half of the flow chart of the phase identification processing shown in FIG. 14 is different from the latter half of the flow chart of the phase identification processing of the first embodiment (FIG. 9) in the following point as a step performed by the current sensor abnormality determination part 29.

(2F1) After S212, a determination step of S223 and steps S224, 225 performed if S223 is YES are included.

(2F2) If S223 is NO, the procedure proceeds to S216.

In other words, in the case where it is identified that the current sensor of one phase or more is abnormal, in the fail safe mode in the first embodiment, the shutdown is always performed (see S212, S216 in FIG. 9), whereas the second embodiment is characterized in that the processing is divided into the case where an abnormality is caused in the current sensor of one phase and the case where an abnormality is caused in each of the current sensors of two phases or three phases.

In S223, it is determined whether or not the phase in which "corrected current deviation>deviation threshold value" is only one phase. In S224 to which the procedure proceeds if S223 is YES, the phase selection part 25 selects one phase of the control phase and one phase of the monitor phase from two phases except for the phase in which the current sensor is determined to be abnormal, that is, two phases in which the current sensor is normal. In S225, the control current estimated value calculation part 33 calculates the dq current estimated values id_est, iq_est on the basis of the current sensed value of one phase of the control phase.

If S223 is NO, that is, it is determined that the phase in which "corrected current deviation>deviation threshold value" is two phases or three phases, the procedure proceeds to S216, where the shutdown is instructed.

Figure 6:
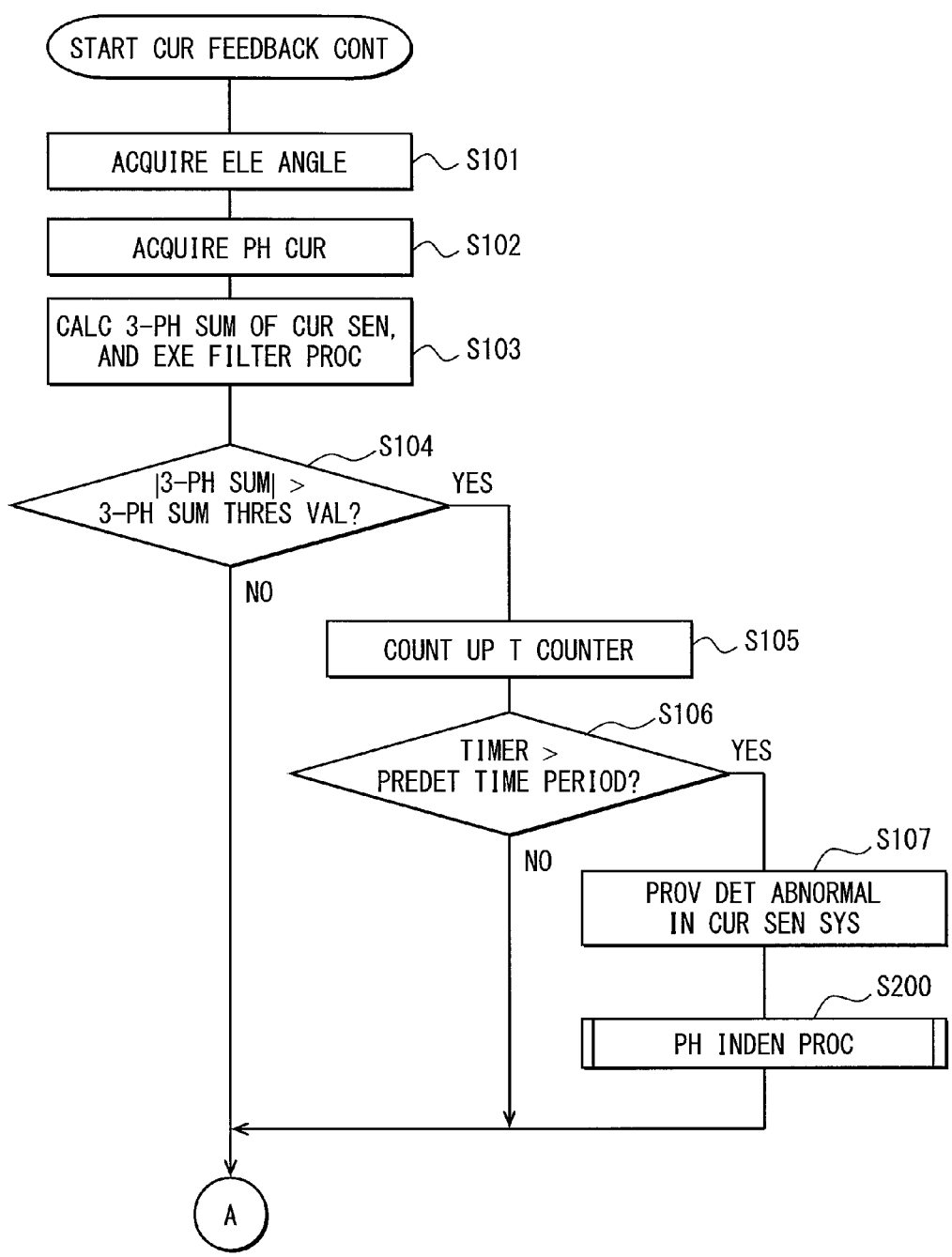
FIG. 6 is a first half of a flow chart of the whole of the current feedback control according to the first embodiment of the present disclosure.
Figure 7:
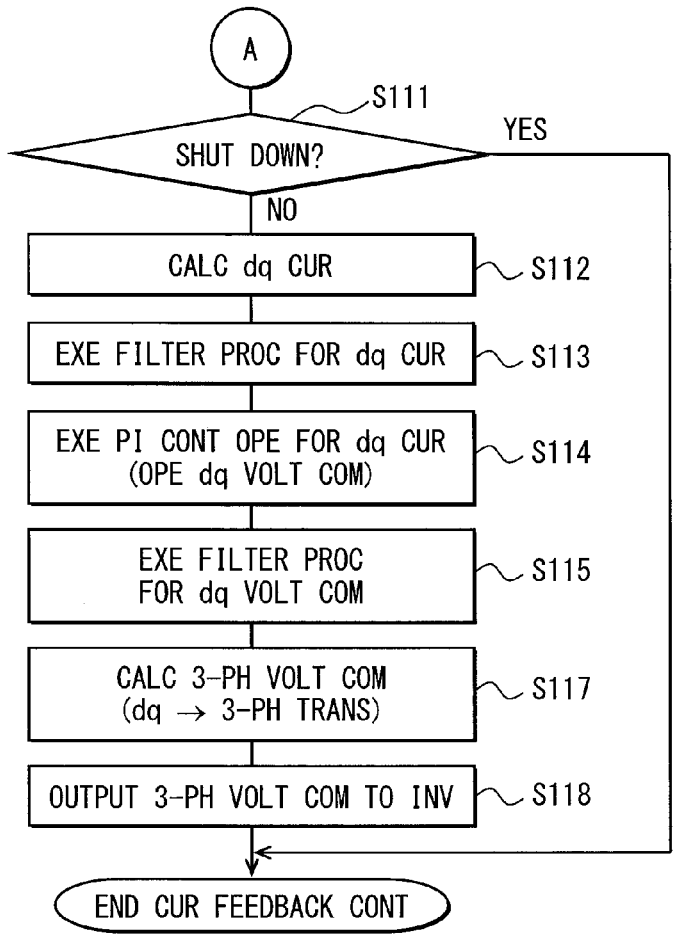
FIG. 7 is a second half of the flow chart of the whole of the current feedback control according to the first embodiment of the present disclosure.

The flow chart of the whole of the current feedback control is basically the same as those shown in FIG. 6 and FIG. 7 of the first embodiment. Here, "the dq current calculation" of S112 shown in FIG. 7 corresponds to the selection of the dq currents by the control current selection part 34. That is, in the case where all of the current sensors of three phases are normal, the dq currents are calculated by "the three phase→dq transformation on the basis of two phases of the control phase", whereas in the case where the current sensor of only one phase is abnormal, the dq currents are calculated by "the current estimated value on the basis of the one phase of the control phase".

In this way, in the second embodiment, in the case where the current sensor of only one phase is abnormal, in the fail safe mode, the AC motor can be continuously driven on the basis of the current estimated value based on the one phase of the control phase. However, depending on the accuracy of the current estimated value, in the control by the one-phase control, the control performance can be reduced when compared with the two-phase control. Hence, it is desirable that the AC motor 2 is not driven permanently thereafter by the one-phase control but that the one-phase control is used as a provisional measure until the current sensor in which abnormality is caused is replaced.

From the viewpoint of the AC motor 2, "the evacuative running" means the running in which the number of revolutions and the output torque are set constant as closely as possible, that is, desirably, sudden start and sudden stop are avoided and the running speed is set at a constant speed as closely as possible. In the evacuative running, the request for the acceleration performance and the comfortable ride (drivability) of the vehicle is reduced and hence the one-phase control by the current estimated value based on the one phase of the control phase is allowed to be provisionally used.

In this regard, during the evacuative running, the time constant of the filtering processing of S113 and S115 (see FIG. 7) may be the same as those during the phase identification processing or may be set smaller as is the case of the normal running.

Further, when it is identified by the phase identification processing that the current sensors of two phases or more are abnormal, the control section 152 stops the drive of the AC motor 2 according to the shutdown instruction.

In the case where the current sensors of two phases or more are abnormal, the number of normal current sensors is one or zero. In the case where the number of normal current sensors is zero, the control does not come into effect. Further, in the case where the number of normal current sensors is one, even if the control comes into effect by the current sensor single-phasing technique, the current sensor for monitoring the sensed value of the current sensor for controlling cannot be secured. Hence, by stopping the drive of the AC motor 2 by the shutdown instruction, the idea of failsafe can be realized.

Third Embodiment

An electric motor control device of a third embodiment of the present disclosure will be described with reference to FIG. 15 to FIG. 17. The third embodiment is characterized by eliminating the need of performing the dividing correction to the current deviation.

Figure 15:
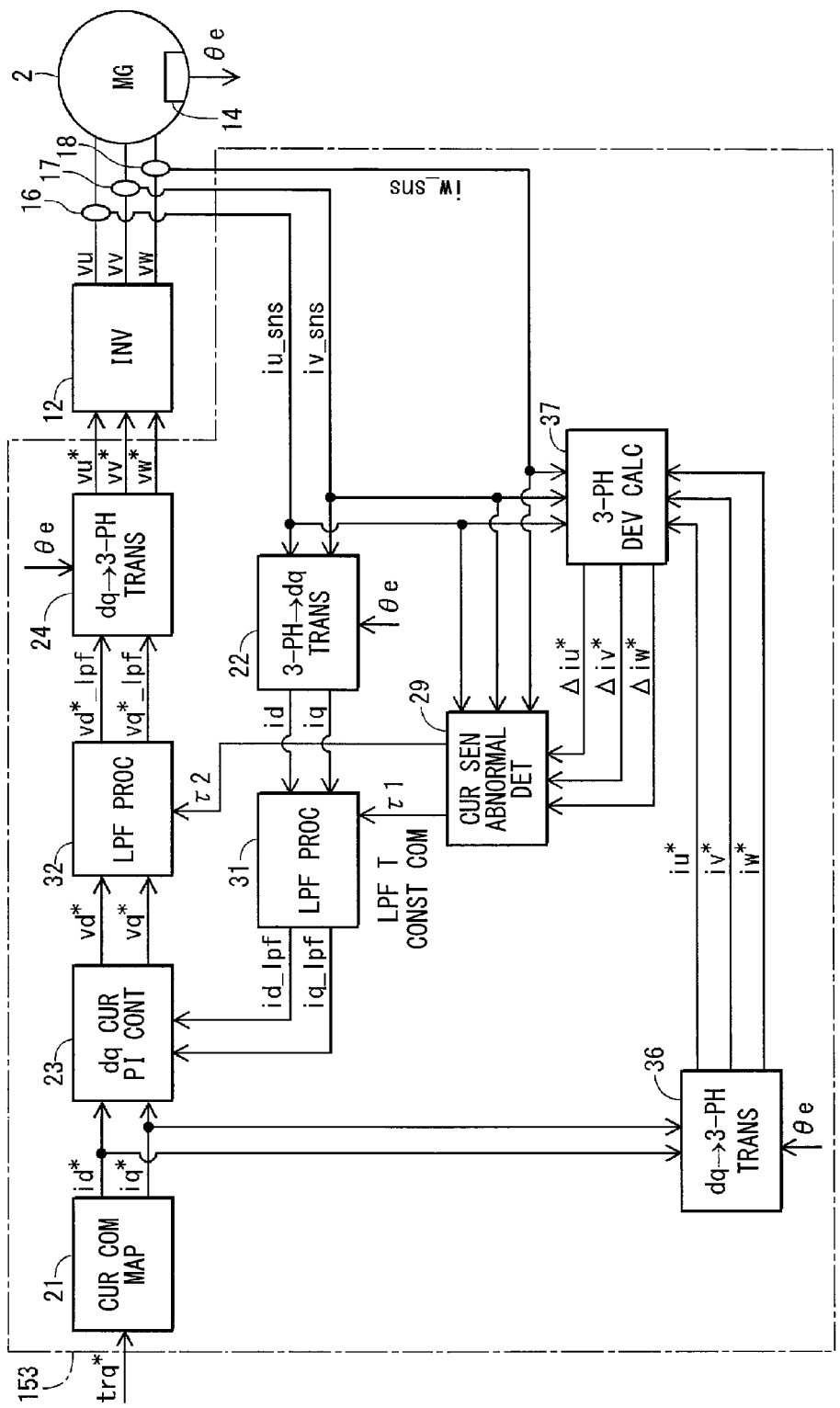
FIG. 15 is a block diagram to show the construction of a control section of a control device of an AC motor according to a third embodiment of the present disclosure.

As shown in FIG. 15, a control section 153 of the electric motor control device of the third embodiment of the present disclosure includes a dq→three phases transformation part 36 for transforming the dq current command values id*, iq* to the three-phase current command values iu*, iv*, iw* when compared with the control section 151 of the first embodiment. The three-phase current command values iu*, iv*, iw* calculated by the dq→three phases transformation part 36 are inputted as "the current basic values" to the three-phase deviation calculation part 37 in place of the current estimated values iu_est, iv_est, iw_est in the first embodiment. Furthermore, the control section 153 of the third embodiment does not include the current estimated value calculation part 26 of the first embodiment.

The three-phase deviation calculation part 37 calculates the current deviations Δiu*, Δiv*, Δiw* between the three-phase current command values iu*, iv*, iw* and the current sensed values iu_sns, iv_sns, iw_sns.

In this construction, the current deviations are not calculated on the basis of the current estimated values estimated on the basis of the current sensed value iw_sns of the monitor phase. Hence, in the case where an offset error is caused in the monitor phase, the deviation of the other phase is not affected by the offset error. For this reason, unlike the first embodiment, the three-phase deviation correction part 28 for performing the dividing correction is not required. Hence, the current deviations Δiu*, Δiv*, Δiw* are directly inputted to the current sensor abnormality determination part 29.

Figure 16:
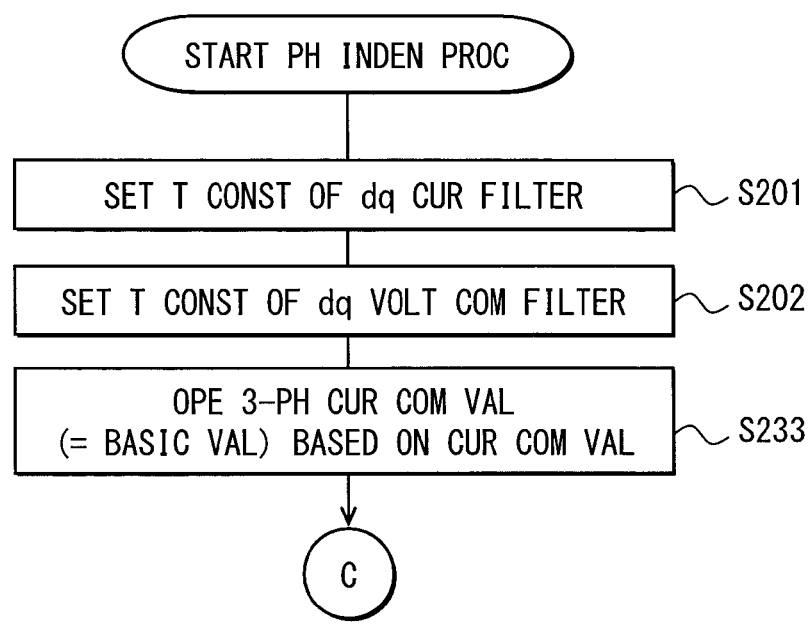
FIG. 16 is a first half of a flow chart of phase identification processing according to the third embodiment of the present disclosure.
Figure 17:
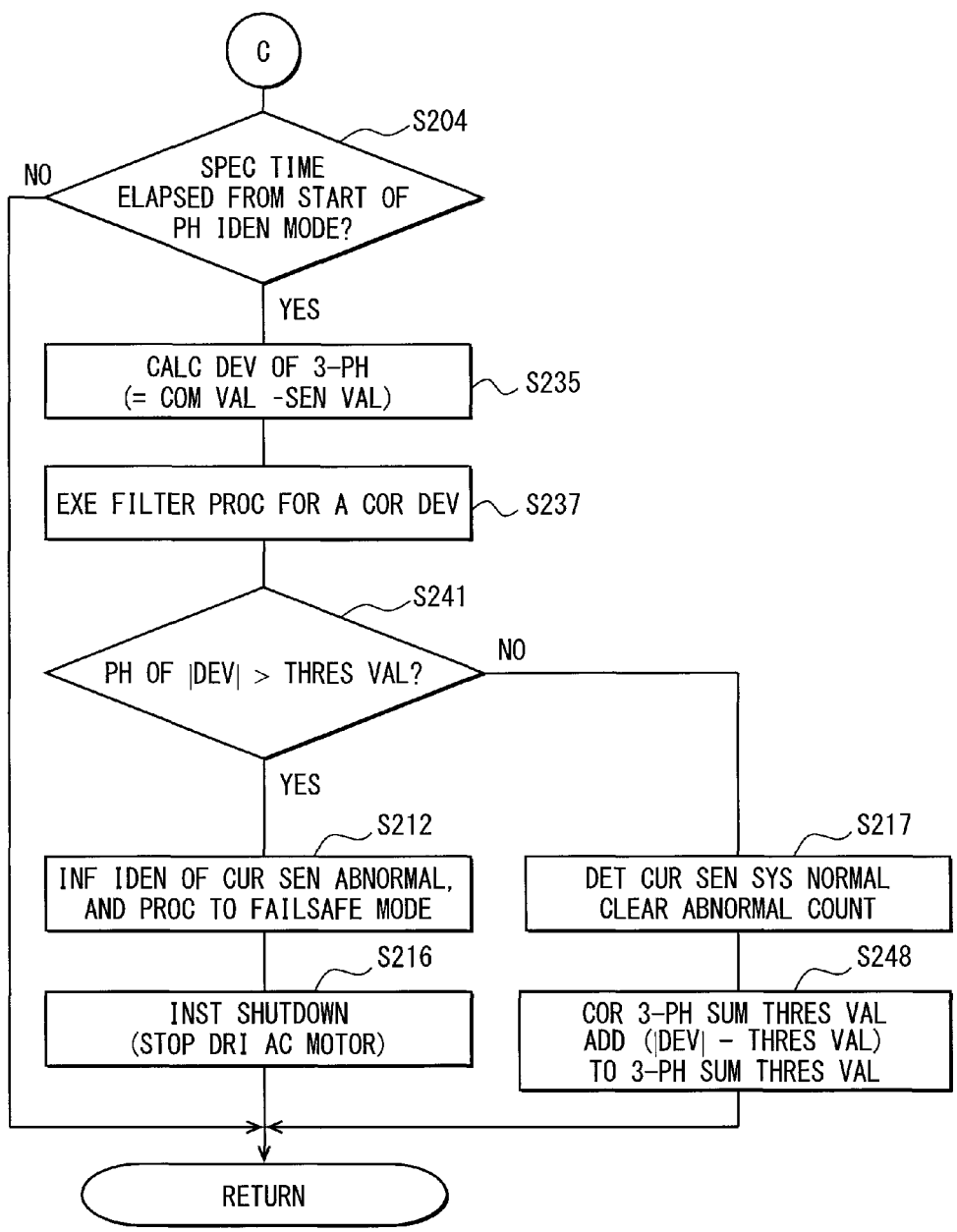
FIG. 17 is a second half of the flow chart of the phase identification processing according to the third embodiment of the present disclosure.

Furthermore, the flow chart of the phase identification processing shown in FIG. 16 and FIG. 17 is different in the following points from the flow chart of the phase identification processing of the first embodiment (see FIG. 8 and FIG. 9).

(3F1) In place of S203, S233 is included in which "three-phase current command values are calculated on the basis of the dq current command values".

(3F2) In place of S205, deviations of three phases (=command value−sensed value) are calculated in S235, and S206 is not included.

(3F3) In place of "the corrected current deviations" of S207, S211, S218, "deviations" not corrected are used in S237, S241, S248.

As described above, in the third embodiment, the current deviations Δiu*, Δiv*, Δiw* are calculated by using three-phase command values iu*, iv*, iw* as the current basic values. Hence, an abnormality of the current sensor can be simply determined without requiring the special dividing correction.

Fourth Embodiment

An electric motor control device of a fourth embodiment of the present disclosure will be described with reference to FIG. 18 to FIG. 20. The first embodiment is based on a technical idea such that "the electric motor control device includes the filter system and delays the response of the feedback control by the filter system, thereby generating the variation visualizing state". On the other hand, the fourth embodiment is based on a technical idea such that "the electric motor control device apparently stops the response of the feedback control by fixing the voltage command, thereby generating the variation visualizing state". In other words, "the variation visualizing state" of the fourth embodiment corresponds to a state in which the feedback is not performed, so to speak, "an open state".

Figure 18:
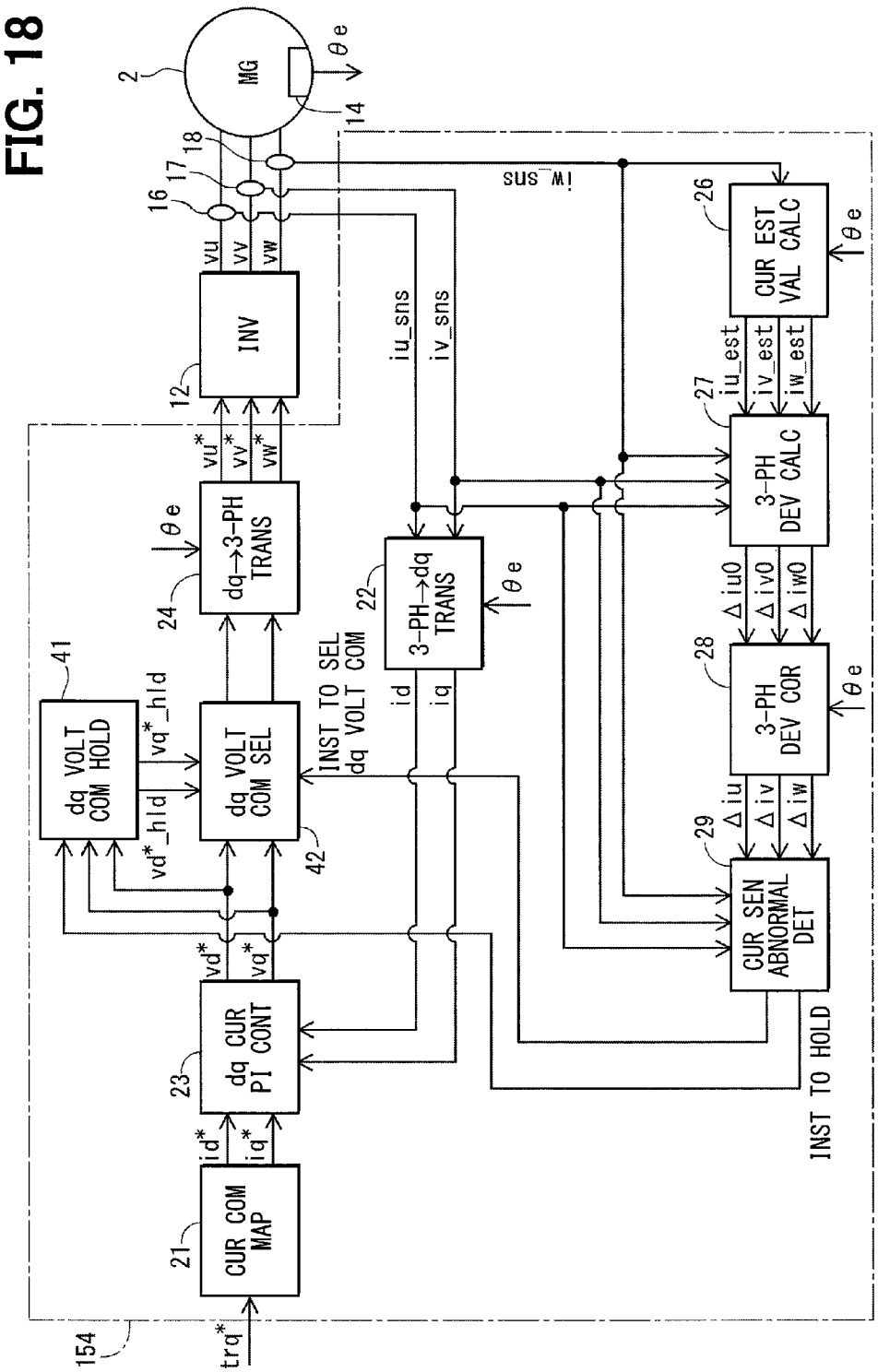
FIG. 18 is a block diagram to show a construction of a control section of a control device of an AC motor according to a fourth embodiment of the present disclosure.

As shown in FIG. 18, a control section 154 of the electric motor control device of the fourth embodiment includes a dq voltage command hold part 41 and a dq voltage command selection part 42 in place of the LPF processing parts 31, 32 when compared with the control section 151 of the first embodiment.

When the current abnormality determination part 29 provisionally determines that the current sensor system is abnormal, the current abnormality determination part 29 gives a hold instruction to the dq voltage command hold part 41 and gives a dq voltage command selection instruction to the dq voltage command selection part 42. The dq voltage command hold part 41 receiving the hold instruction holds the dq voltage command values vd*, vq* at the time of starting the phase identification mode. Further, the dq voltage command selection part 42 receiving the dq voltage command selection instruction selects hold values vd*_hld, vq*_hld during the phase identification mode and outputs the hold values vd*_hld, vq*_hld to the dq→three phases transformation part 24. When it is identified that the current sensor is abnormal, the dq voltage command selection part 42 releases the selection of the hold values vd*_hld, vq*_hld, and in the case where the shutdown is not made, thereafter, the dq voltage command selection part 42 selects the dq voltage command values vd*, vq* outputted from the dq current PI control part 23.

Figure 19:
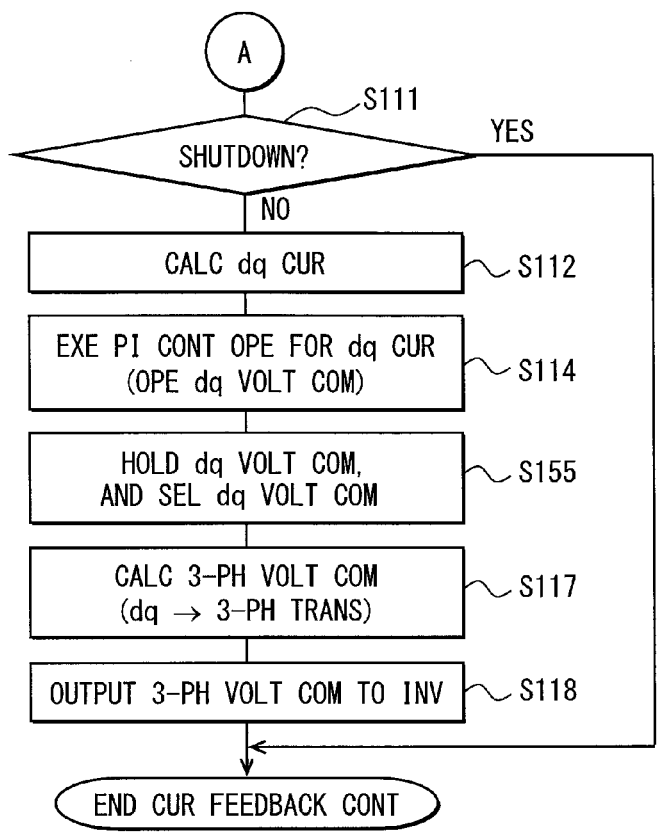
FIG. 19 is a second half of a flow chart of the whole of a current feedback control according to the fourth embodiment of the present disclosure.

The first half of the flow chart of the whole of the current feedback control of the fourth embodiment is the same as that shown in FIG. 6 of the first embodiment, whereas the latter half shown in FIG. 19 is different from FIG. 7 of the first embodiment in the following points.

(4F1) In place of S113 and S115, S155 of "dq voltage command hold processing, dq voltage command selection processing" is included.

Figure 20:
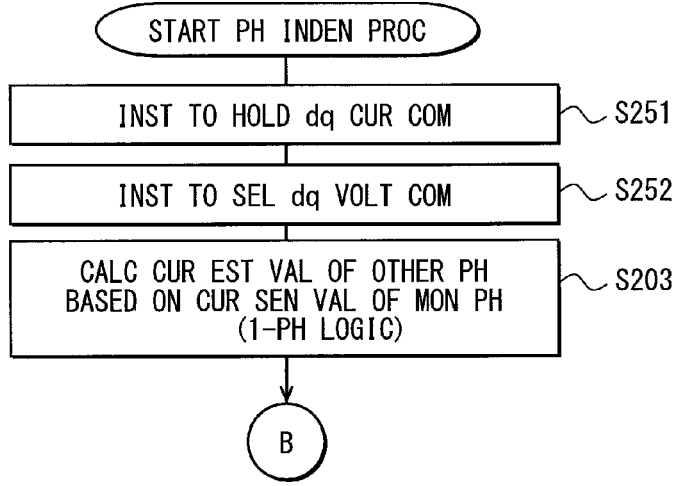
FIG. 20 is a first half of a flow chart of phase identification processing according to the fourth embodiment of the present disclosure.

Further, the first half of the flow chart of the fourth embodiment shown in FIG. 20 is different from FIG. 8 of the first embodiment in the following point. The latter half is the same as FIG. 9 of the first embodiment.

(4F2) In place of S201 and S202, S251 of "dq voltage command hold instruction" and S252 of "dq voltage command selection instruction" are included.

In the first embodiment, it is preferable that proper values are set for the time constants τ1, τ2 to be instructed to the LPF processing part 31, 32 according to the characteristics of an object to be controlled. On the other hand, in the fourth embodiment, the dq voltage command hold part 41 simply holds the dq voltage command values vd*, vq* at the time of starting the phase identification mode. Hence, the electric motor control device of the fourth embodiment can be applied for wide purposes regardless of the inverter 12 and the electric characteristics of the AC motor 2.

Other Embodiments (A) The first embodiment includes both of the LPF processing part 31 for performing the filtering processing for the dq currents and the LPF processing part 32 for performing filtering processing for the dq voltage commands. It is also recommended to provide any one of these LPF processing parts 31, 32. By delaying the control response of any one of them, the response of the whole of the current feedback control is delayed to thereby generate the variation visualizing state. In the case where only the LPF processing part 31 is provided, S125 of the flow chart (FIG. 7) of the whole of the current feedback control and S202 of the flow chart (FIG. 8) of the phase identification processing are omitted. Further, in the case where only the LPF processing part 32 is provided, S123 of the flow chart (FIG. 7) of the whole of the current feedback control and S201 of the flow chart (FIG. 8) of the phase identification processing are omitted.

(B) In the second embodiment, when it is identified that the current sensor of one phase of the monitor phase is abnormal, the phase selection part 25 selects a new monitor phase in the failsafe mode and performs "one-phase control" on the basis of "the current estimated value based on the one phase of the control phase". On the other hand, it is also recommended that only when the current sensor of one phase other than the monitor phase is abnormal, "the one-phase control" is performed and that when the current sensor of the monitor phase is abnormal, the shutdown is performed.

Furthermore, in the failsafe mode of the second embodiment, it is also recommended to switch between "one-phase control by the current estimated values based on one phase of the control phase" and "two-phase control by the current estimated values based on two phases of the control phase", as required. For example, it is also recommended to switch between the one-phase control and the two-phase control at specified intervals. Alternatively, it is also recommended that: when the number of revolutions is not more than a specified value, the two-phase control is performed to thereby give priority to the control performance; and when the number of revolutions is more than the specified value, the one-phase control is performed to thereby give priority to the detection of an abnormality by monitoring.

In this way, in the situation where the number of phases in which the current sensor is normal is two phases, two requests of the control performance and the abnormality detection can be satisfied.

(C) The second to fourth embodiments can be combined with each other as required.

For example, the third embodiment that does not require the dividing correction in the phase identification mode may be combined with the second embodiment that selects the monitor phase in the failsafe mode. Alternatively, the fourth embodiment that holds the dq voltage instruction in the phase identification mode may be combined with the second embodiment.

(D) In the first embodiment, by making the filter time constant of the LPF processing part 32 infinite, as is the case of the fourth embodiment, the dq voltage commands vd*, vq* can be fixed and the response of the current feedback control can be stopped.

(E) The current and voltage in the current feedback control are not limited to those expressed by the dq coordinate system, but those expressed by the other rotating coordinate system may be used.

(F) The control section of the embodiments described above employs "a current feedback control system" in which the current sensed value or the current estimated value is fed back to the current command. The current feedback control system is usually employed in the case where the inverter is driven in a sine wave PWM control mode or an over-modulated PWM control mode.

On the other hand, in the case where the inverter is driven in a square wave control mode not using the current command, "a torque feedback control system" in which a torque estimated value based on the current sensed value is fed back to a torque command is employed. Also to this torque feedback control system can be applied the technical idea of the present disclosure such that "by delaying or stopping the response of the feedback control, the variation visualizing state is generated and the phase identification processing is performed". Since the square wave control mode can increase a voltage utilization ratio more than the sine wave PWM control mode or the over-modulated PWM control mode, the square wave control mode can be effectively used within a range in which high rotation and high torque are required.

(G) In the embodiments described above, the AC motor is the three-phase permanent magnet type synchronous motor, but an induction motor or the other synchronous motor may be employed in the other embodiments. Further, the AC motor of the embodiments described above is the so-called motor generator that has both of the function as an electric motor and the function as a generator, but the AC motor does not need to have the function as the generator in the other embodiments.

(H) The control device of the AC motor according to the present disclosure may be applied not only to a system having only one set of the inverter and the AC motor like the embodiments described above but also to a system having two or more sets of the inverters and the AC motors. Furthermore, the control device of the AC motor according to the present disclosure may be applied to a system of an electric train or the like in which a plurality of AC motors are connected in parallel to one inverter.

(I) The control device of the AC motor according to the present disclosure is not limitedly applied to the AC motor of the hybrid automobile having the construction shown in FIG. 1 but may be applied to an AC motor of an electric vehicle having any construction and may be applied to an AC motor other than the electric vehicle.

The above disclosure has the following aspects.

According to an aspect of the present disclosure, a control device for a three-phase alternate current motor includes: an inverter having a plurality of switching elements for driving the three-phase alternate current motor; a plurality of current sensors, each of which senses a current passing through a respective phase among three phases of the alternate current motor; and a control means that has a feedback control operation part for operating a voltage command of each phase so as to converge a deviation between a current sensed value sensed by a respective current sensor and a current command value of a respective phase to be zero and that switches on and off each switching element based on the voltage command of each phase so as to control the current passing through a respective phase of the alternate current motor. When an absolute value of a sum of the current sensed values of three phases is larger than a predetermined three-phase sum threshold value, the control means: executes a provisional current sensor system abnormality determination, which indicates a possibility that an abnormality is generated in at least one of the current sensors; generates a variation visualizing state, in which a response of a feedback control with respect to a variation in the current sensed value caused by an occurrence of the abnormality in the at least one of the current sensors is delayed, or in which the response of the feedback control is stopped; and performs a phase identification processing for identifying the at least one of the current sensors corresponding to a phase, in which an absolute value of a current deviation determined based on a difference between a current basic value and the current sensed value of the phase is larger than a predetermined deviation threshold value, in the variation visualizing state.

Alternatively, the control means may perform a filtering processing for setting a delay time of an output response with respect to an input variation to be longer than a normal control so that the control means generates the variation visualizing state, and the delay time relates to at least one of a current to be fed back to the feedback control operation part and a voltage command outputted by the feedback control operation part. Alternatively, the control means may fix the voltage command outputted from the feedback control operation part so that the control means generates the variation visualizing state. Further, the control means may calculate the current deviation of each phase by using a current estimated value as the current basic value in the phase identification processing, and the current estimated value is determined based on both of a current sensed value of a monitor phase as one of three phases and an electric angle of the alternate current motor. Furthermore, when the abnormality is caused in a current sensor on the monitor phase, the control means may perform a dividing correction for dividing an error component, which is to be distributed to the current deviation of the other phases by an error of a current sensed value of the monitor phase, based on a predetermined distribution factor.

Alternatively, the control means may calculate the current deviation of each phase by using a current command value of a respective phase as the current basic value in the phase identification processing. Alternatively, when it is determined in the phase identification processing that the abnormality is caused in the current sensors of two or more phases, the control means may stop driving the alternate current motor. Alternatively, when it is determined in the phase identification processing that the abnormality is caused in the current sensor of only one phase, the control means may select one phase from two phases other than the only one phase as a control phase. In each of the two phases, a respective current sensor is normal, and the control means controls the current to be passed through the alternate current motor by the feedback control with a current estimated value, which is determined based on the current sensed value of the control phase. Alternatively, when it is determined in the phase identification processing that the current sensors of three phases are normal, the control means may control the current to be passed through the alternate current motor by the feedback control based on the current sensed values of two phases as two control phases. Alternatively, when it is determined in the phase identification processing that the current sensors of three phases are normal, the control means may correct the three-phase sum threshold value based on the current deviations of three phases.

In the above control device, "The variation visualizing state" means either a state in which a response of a feedback control to a variation in the current sensed value caused by the occurrence of abnormality is delayed or a state in which the response is stopped. Furthermore, "the phase identification processing" means processing of identifying a phase, in which an absolute value of a current deviation based on a difference between a current basic value and a current sensed value for each phase is larger than a specified deviation threshold value, as being a phase in which a current sensor is abnormal.

In the related art, when the sum of the current sensed values of three phases substantially becomes a value different from zero, it is possible to determine that any one of current sensors is abnormal, but even if the current sensor of any phase is abnormal, it is possible only to determine that the sum of the current sensed values of three phases is not zero, so that it is not possible to identify the current sensor of which phase is abnormal.

Then, the inventors studied a method for detecting an abnormality of a current sensor for each phase by comparing two values of "a current basic value" and "a current sensed value of the current sensor" for each phase. Here, it can be thought that "a current estimated value of the other phase estimated on the basis of a current sensed value of the current sensor of one phase" or a current command value is employed as "the current basic value".

However, as a result of earnest study of this method for detecting an abnormality of a current sensor, the inventors found the following problems: in a drive control system of an AC motor using a high-speed current feedback control, which can be applied to a vehicle, a current sensed value of a current sensor used for controlling is precisely controlled so as to always correspond with a current command value, so that even in any state where an abnormality is caused in the current sensor, the current sensed value of the current sensor apparently corresponds with the current command value regardless of the current actually passed through the AC motor.

Referring to FIGS. 3A, 3B, and 3C, when an offset abnormality is caused in the V phase as shown in FIG. 3B, dq currents are varied in the control using the dq coordinate system. Then, in the high-speed current feedback control, a control operation functions so as to suppress an electric primary variation in the dq currents and outputs a voltage command to drive an inverter. That is, as shown in FIG. 3C, the control of making the current correspond with the command is performed. As a result, an apparent electric primary variation disappears.

Hence, even if it is tried to determine whether or not the current sensor is abnormal for each phase by comparing two values of the current estimated value, which is calculated on the basis of the current sensed value of the current sensor of one phase, or the current command value and the current sensed value of the current sensor, it is not possible to identify a phase in which the current sensor is abnormal during the usual high-speed feedback control routine because the current sensed value of the current sensor for controlling is precisely controlled so as to correspond with the current command value by the high-speed feedback control operation.

Furthermore, as another problem, there is presented a problem that an error caused by the abnormality of the current sensor of the control phase cannot be divided from an error caused by the abnormality of the current sensor of the monitor phase.

Therefore, even if this method for detecting an abnormality of a current sensor is employed, as is the case of the determination by the three-phase sum, it is not possible to identify a phase in which a current sensor is abnormal.

In contrast to this, the present disclosure makes it possible to view an offset error by generating the variation visualizing state in which the response of the feedback control is delayed or stopped.

The disclosure performs the phase identification processing of comparing the current sensed value with the deviation threshold value of each phase in the variation visualizing state, thereby being able to identify a phase in which an abnormality is caused in the current sensor. In this regard, a state in which the control means performs the phase identification processing is referred to as "a phase identification mode". It is preferable that the phase identification mode is performed for a specified period in an operating state in which a variation in the number of revolutions and the output torque of the AC motor is small.

Here, a construction for delaying the response of the feedback control can be realized by employing a filter system in which the operation of voltage is comparatively slow. Specifically, it is recommended that filtering processing using a low pass filter is performed for at least one of the current to be fed back to a feedback control operation part and the voltage command outputted by the feedback control operation part.

On the other hand, a construction for stopping the response of the feedback control can be realized, for example, by fixing a voltage command outputted by the feedback control operation part. In this case, it is recommended that the feedback control operation part updates the voltage command at usual control intervals and selectively uses not a newest voltage command but a fixed voltage command during the phase identification mode.

Furthermore, "a current estimated value" or "a current command value" can be used as "the current basic value" to be compared with the current sensed value so as to calculate a current deviation in the phase identification processing.

"The current estimated values" of three phases are calculated on the basis of the current sensed value of the monitor phase and the electric angle of the AC motor. For this reason, if the current sensor of the monitor phase becomes abnormal, not only an error is caused in the current estimated value of the monitor phase but also the current estimated values of the other phases are affected. Hence, although the current sensors of the other phases are normal, the current deviations are likely to become large.

At this time, distribution factors at which the error of the monitor phase is to be distributed to the current deviations of the other phases are uniquely determined by an estimation equation or the number of revolutions. Hence, it is possible to prevent an erroneous determination in the phase identification processing, for example, by defining the distribution factors of the current deviations of the respective phases for the number of revolutions by the use of a map and by dividing components derived from the error of the monitor phase on the basis of the distribution factors corresponding to the number of revolutions at that time.

On the other hand, in the case where the "current command values" of three phases are used as the current basic values, the correction like this is not required.

Furthermore, as the result of the phase identification processing, the control means can divide the processing after the phase identification processing into cases according to the number of phases in which the current sensor is identified as being abnormal.

In the case where the current sensors of two or more phases are abnormal, the number of normal current sensors is zero or one. In the case where the number of normal current sensors is zero, the control cannot be performed. Furthermore, in the case where the number of normal current sensors is one, even if the control can be performed by a current sensor single-phasing technique, a current sensor for monitoring, which monitors the sensed value of the current sensor for controlling, cannot be ensured. Hence, from the viewpoint of fail-safe, it is preferable to stop driving the AC motor. This is referred to as "shutdown".

In the case where the current sensor of only one phase is abnormal, it is also recommended that one phase of two phases in which the current sensors are normal is selected as the control phase and that the current to be passed through the AC motor is controlled by the feedback control using the current estimated value based on the current sensed value of the control phase.

Alternatively, although it is provisionally determined that the current sensor system is abnormal, as the result of the phase identification processing, it can be thought that the current sensors of three phases are normal. For example, even if the deviation between the current basic value and the current sensed value of each phase is not more than an abnormality determination threshold value, if the deviations are of the same sign, when the sum of current sensed values of three phases are calculated, the deviations are also calculated as the sum of three phases, so that there can be caused a case where the sum of the deviations is more than the abnormality determination threshold value.

In this case, the error of the current sensor of each phase does not reach the amount of error which is essentially determined to be abnormal, so that it is recommended that the current to be passed through the AC motor is controlled by the feedback control based on the current sensed values of the control phase of two phases other than the monitor phase.

The present disclosure can be applied to a control device of an AC motor mounted in an electric vehicle, for example, a hybrid automobile and an electric automobile. In the AC motor mounted in the electric vehicle, when compared with an AC motor in the other technical field, a request for an improvement in control accuracy and reliability will be higher. Hence, when the control device of the AC motor according to the present disclosure is applied to the AC motor mounted in the electric vehicle, an effect will be produced especially in preventing a reduction in drivability and in realizing fail-safe.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A control device for a three-phase alternate current motor, the control device comprising:
an inverter having a plurality of switching elements for driving the three-phase alternate current motor;
a plurality of current sensors, each of which senses a current passing through a respective phase among three phases of the alternate current motor; and
a control means that has a feedback control operation part for operating a voltage command of each phase so as to converge a deviation between a current sensed value sensed by a respective current sensor and a current command value of a respective phase to be zero and that switches on and off each switching element based on the voltage command of each phase so as to control the current passing through a respective phase of the alternate current motor,
wherein, when an absolute value of a sum of the current sensed values of three phases is larger than a predetermined three-phase sum threshold value, the control means:
executes a provisional current sensor system abnormality determination, which indicates a possibility that an abnormality is generated in at least one of the current sensors;
generates a variation visualizing state, in which a response of a feedback control with respect to a variation in the current sensed value caused by an occurrence of the abnormality in the at least one of the current sensors is delayed, or in which the response of the feedback control is stopped; and
performs a phase identification processing for identifying the at least one of the current sensors corresponding to a phase, in which an absolute value of a current deviation determined based on a difference between a current basic value and the current sensed value of the phase is larger than a predetermined deviation threshold value, in the variation visualizing state.

2. The control device according to claim 1,
wherein the control means performs a filtering processing for setting a delay time of an output response with respect to an input variation to be longer than a normal control so that the control means generates the variation visualizing state, and wherein the delay time relates to at least one of a current to be fed back to the feedback control operation part and a voltage command outputted by the feedback control operation part.

3. The control device according to claim 1, wherein the control means fixes the voltage command outputted from the feedback control operation part so that the control means generates the variation visualizing state.

4. The control device according to claim 1, wherein the control means calculates the current deviation of each phase by using a current estimated value as the current basic value in the phase identification processing, and wherein the current estimated value is determined based on both of a current sensed value of a monitor phase as one of three phases and an electric angle of the alternate current motor.

5. The control device according to claim 4, wherein, when the abnormality is caused in a current sensor on the monitor phase, the control means performs a dividing correction for dividing an error component, which is to be distributed to the current deviation of the other phases by an error of a current sensed value of the monitor phase, based on a predetermined distribution factor.

6. The control device according to claim 1, wherein the control means calculates the current deviation of each phase by using a current command value of a respective phase as the current basic value in the phase identification processing.

7. The control device according to claim 1, wherein, when it is determined in the phase identification processing that the abnormality is caused in the current sensors of two or more phases, the control means stops driving the alternate current motor.

8. The control device according to claim 1, wherein, when it is determined in the phase identification processing that the abnormality is caused in the current sensor of only one phase, the control means selects one phase from two phases other than the only one phase as a control phase, wherein, in each of the two phases, a respective current sensor is normal, and wherein the control means controls the current to be passed through the alternate current motor by the feedback control with a current estimated value, which is determined based on the current sensed value of the control phase.

9. The control device according to claim 1, wherein, when it is determined in the phase identification processing that the current sensors of three phases are normal, the control means controls the current to be passed through the alternate current motor by the feedback control based on the current sensed values of two phases as two control phases.

10. The control device according to claim 1, wherein, when it is determined in the phase identification processing that the current sensors of three phases are normal, the control means corrects the three-phase sum threshold value based on the current deviations of three phases.

* * * * *